US009513665B2

(12) United States Patent
Magi

(10) Patent No.: US 9,513,665 B2
(45) Date of Patent: Dec. 6, 2016

(54) WEARABLE ELECTRONIC DEVICE INCLUDING A FORMABLE DISPLAY UNIT

(71) Applicant: Intel Corporation, Santa Clara, CA (US)

(72) Inventor: Aleksander Magi, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 353 days.

(21) Appl. No.: 14/141,409

(22) Filed: Dec. 26, 2013

(65) Prior Publication Data

US 2015/0185762 A1 Jul. 2, 2015

(51) Int. Cl.
*G06F 3/041* (2006.01)
*G06F 1/16* (2006.01)

(52) U.S. Cl.
CPC ............. *G06F 1/163* (2013.01); *G06F 1/1643* (2013.01); *G06F 1/1652* (2013.01)

(58) Field of Classification Search
None
See application file for complete search history.

(56) References Cited

U.S. PATENT DOCUMENTS

| 265,044 | A | 9/1882 | Engelmann |
| D255,022 | S | 5/1980 | Hofman |
| D616,790 | S | 6/2010 | Mear |
| D625,928 | S | 10/2010 | Lee et al. |
| D644,201 | S | 8/2011 | Park et al. |
| D704,938 | S | 5/2014 | Mischel, Jr. et al. |
| D705,777 | S | 5/2014 | Groene et al. |
| D719,158 | S | 12/2014 | Akana et al. |
| 2010/0302199 | A1* | 12/2010 | Taylor ............... G06F 3/046 345/174 |
| 2012/0318019 | A1 | 12/2012 | Cho |
| 2013/0055761 | A1 | 3/2013 | Alford et al. |

(Continued)

FOREIGN PATENT DOCUMENTS

| WO | WO 2009-097592 A1 | 8/2009 |
| WO | 2015/099952 | 7/2015 |

OTHER PUBLICATIONS

Liu, C., et al., "Review of progress in shape-memory polymers," Journal of Materials Chemistry, 2007, vol. 17, pp. 1543-1558, 16 pages.

(Continued)

*Primary Examiner* — Nicholas Lee
(74) *Attorney, Agent, or Firm* — Patent Capital Group

(57) ABSTRACT

Particular embodiments described herein provide for a wearable electronic device, such as a bracelet, watch, wristband or armband that includes a circuit board coupled to a plurality of electronic components (which may include any type of components, elements, circuitry, etc.). One particular example implementation of a wearable electronic device may include a strap portion and a display portion that is secured to the strap portion. The display portion can include a formable display unit that comprises a formable material layer configured to be manipulated in one or more directions. The formable material layer can be configured to be manipulated in a first direction from a default position to a deformed position, which can be held until the formable material layer is manipulated in a second direction back to the default position.

25 Claims, 18 Drawing Sheets

(56) References Cited

U.S. PATENT DOCUMENTS

| | | | |
|---|---|---|---|
| 2013/0100601 A1* | 4/2013 | Griffin | G06F 1/1616 |
| | | | 361/679.27 |
| 2013/0127690 A1 | 5/2013 | Tsai | |
| 2013/0155020 A1 | 6/2013 | Heubel et al. | |
| 2013/0191741 A1 | 7/2013 | Dickinson et al. | |
| 2013/0254705 A1 | 9/2013 | Mooring et al. | |
| 2014/0086028 A1 | 3/2014 | Carrion | |
| 2015/0022438 A1* | 1/2015 | Hong | H04M 1/7253 |
| | | | 345/156 |

OTHER PUBLICATIONS

"Ferrofluid," Wikipedia; http://en.wikipedia.org/wiki/Ferrofluid, printed Nov. 11, 2013, 7 pages.

"Miga Motor Company: Modern Motion: Shape Memory Alloy Actuators," http://www.migamotors.com, printed Jan. 16, 2014, 1 page.

"Robot design—flexinol and other nitinol muscle wires," http://robotics.hobbizine.com/flexinol.html, printed Nov. 11, 2013, 5 pages.

"Shape Memory Alloys," http://webdocs.cs.ualberta.ca/~database/MEMS/sma_/mems/sma.html, printed Nov. 11, 2013, 4 pages.

"Shape-memory alloy," Wikipedia, http://en.wikipedia.org/wiki/Shape_memory_alloy, printed Nov. 11, 2013, 8 pages.

"Shape-memory polymer," Wikipedia, http://en.wikipedia.org/wiki/Shape-memory_polymer, printed Nov. 12, 2013, 7 pages.

"Flexinol® Actuator Wire Technical and Design Data," Dynalloy, Inc.; http//www.dynalloy.com/TechDataWire.php; printed Jan. 16, 2014, 1 page.

"TZ SMA Actuators Actuation Technology Aero Asset Maintainability Inc." http://aam.tz.net/sma-actuators, printed Jan. 16, 2014, 1 page.

"Understanding shape-shifting polymers," MIT News, http://web.mit.edu/newsoffice/2010/memory-polymer-1206.html, printed Nov. 12, 2013, 3 pages.

"Adidas jumps into wearable computing, announces new $399 smartwatch at Mobilize," http://gigaom.com/2013/10/16/adidas-shows-off-new-smartwatch-that-provides-personal-coaching, printed Jan. 16, 2014, 5 pages.

"High tech meets high fashion," Los Angeles Times, http://articles.latimes.com/2013/may/26/image/la-ig-tech-fashion-20130526, printed Jan. 16, 2014, 3 pages.

USPTO Nonfinal Rejection in U.S. Appl. No. 29/477,902, mailed on Jun. 30, 2015, 12 pages.

Home Decorators, Milton Full Length Mirror on Stand, Aug. 24, 2011 [online], [site visited Jul. 7, 2015], available from Internet, <URL: http://www.homedecorators.com/p/milton-full-length-mirror-on-stand/>, 1 page.

International Search Report and Written Opinion in International Application No. PCT/US2014/067775, mailed Mar. 10, 2015, 5 pages.

USPTO Final Rejection in U.S. Appl. No. 29/477,902, mailed on Oct. 21, 2015, 7 pages.

International Preliminary Report on Patentability for International Application No. PCT/US2014/067775 issued Jun. 28, 2016.

* cited by examiner

WEARABLE ELECTRONIC DEVICE INCLUDING A FORMABLE DISPLAY UNIT

TECHNICAL FIELD

Embodiments described herein generally relate to a wearable electronic device including a formable display unit.

BACKGROUND

End users have more electronic device choices than ever before. A number of prominent technological trends are currently afoot (e.g., mobile electronic devices, smaller electronic devices, increased user connectivity, etc.), and these trends are changing the electronic device landscape. One of the technological trends is electronic devices that can be worn by users, sometimes referred to as wearable electronic devices. A user can use and interact with a wearable electronic device to access features of the device and use the device to communicate with users of other electronic devices. In one instance, a user can communicate with another user (through electronic devices) using text messages. However, text messages often lack the ability to convey emotion or personalized notes that may not be represented by text characters available to the user using traditional electronic devices and text input mechanisms such as QWERTY keyboards, etc. Hence, there is a challenge in communicating personalized messages using electronic devices that can enhance user experience and immersion in electronic communications.

BRIEF DESCRIPTION OF THE DRAWINGS

Embodiments are illustrated by way of example and not by way of limitation in the FIGURES of the accompanying drawings, in which like references indicate similar elements and in which.

Figure 1A:
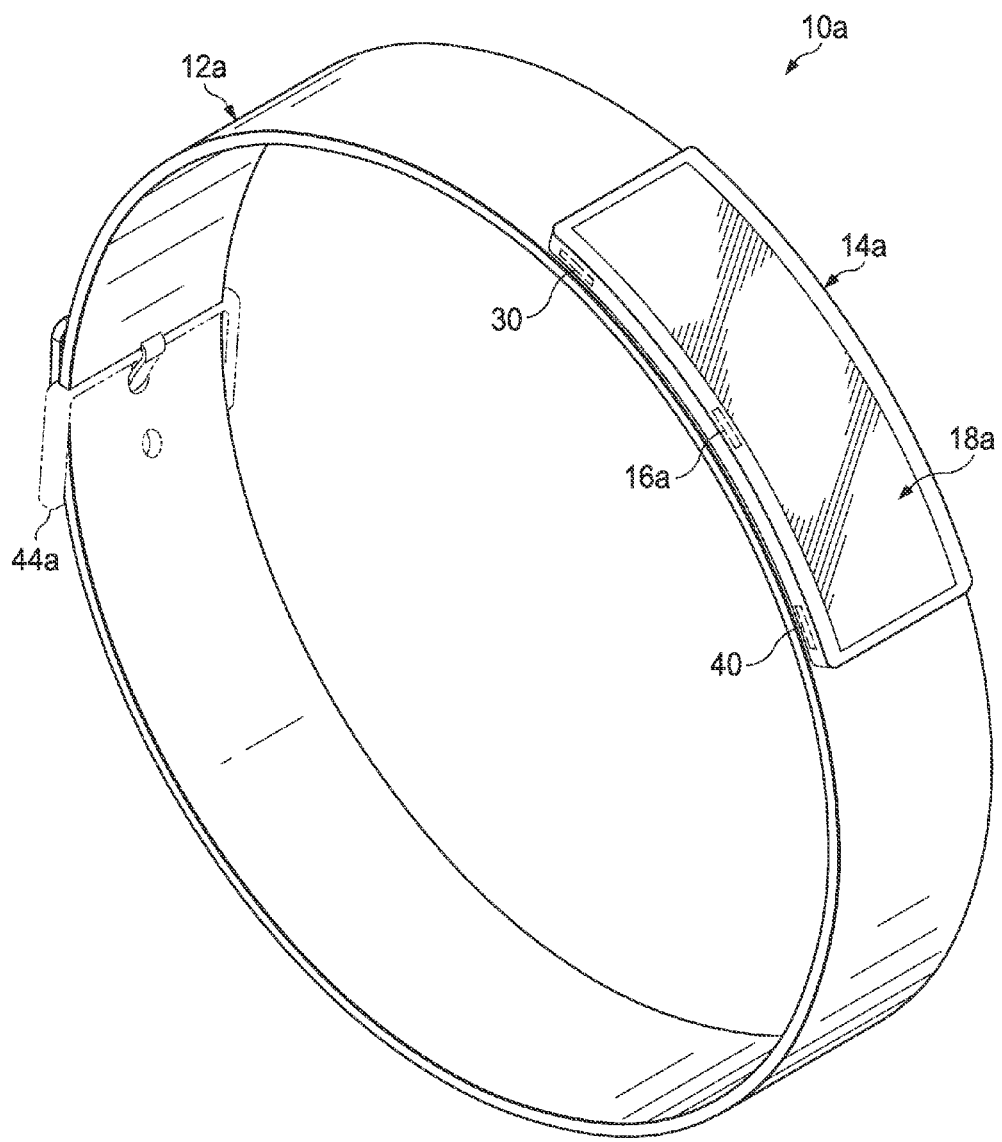
FIG. 1A is a simplified orthographic view illustrating an embodiment of a wearable electronic device, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include a strap portion and a display portion that is secured to the strap portion, wherein the display portion can include a formable display unit that comprises a formable material layer configured to be manipulated in one or more directions. Note, that in at least one embodiment, the formable material layer is configured to be manipulated in a first direction from a first position to a second position, which can be held until the formable material layer is manipulated in a second direction back to the first position. In various embodiments, the formable material layer may comprise at least one of a shape memory alloy, a shape memory polymer and a ferrofluid.

In another example implementation, a formable display unit may include a formable material layer configured to be manipulated in one or more directions; a first insulating layer configured over the formable material layer; a second insulating layer configured beneath the formable material layer; and a control layer configured beneath the second insulating layer, the control layer including a plurality of control elements. Note, that in at least one embodiment, the formable material layer can be manipulated in a first direction by one or more of the plurality of control elements and can be manipulated in a second direction by providing a current to the formable material layer from a current source. In at least other embodiment, the formable material layer can be a ferrofluid fluid, which is manipulated the first direction and the second direction by one or more of the plurality of control elements.

In other example implementations, a method may be provided, which may include determining coordinate data for one or more interactions with a formable display unit; and manipulating, based on the coordinate data, a formable material layer of the display unit in one or more directions. In at least one embodiment, the method may include manipulating the formable material layer in a first direction from a first position to a second position by one or more control elements using the coordinate data. In at least one other embodiment, the method may include manipulating the formable material layer in a second direction from the second position back to the second position by supplying a current to the formable material layer. In at least one other embodiment, the method may include communicating the coordinate data to another electronic device using wireless communication circuitry.

Example Embodiments

The following detailed description sets forth example embodiments of apparatuses, methods, and systems relating to formable display configurations for an electronic device. Features such as structure(s), function(s), and/or characteristic(s), for example, are described with reference to one embodiment as a matter of convenience; various embodiments may be implemented with any suitable one or more of the described features.

FIG. 1A is a simplified orthographic view illustrating an embodiment of a wearable electronic device 10a in accordance with one embodiment of the present disclosure. Wearable electronic device 10a may include a strap portion 12a and a display portion 14a. Display portion 14a can include a formable display unit 18a and a motion input element 16a. Display portion 14a may be disposed within/on and/or supported by strap portion 12a. Formable display unit 18a can include a layer of formable material, at least a pair of insulating layers and a control layer including a plurality of control elements, each of which may be disposed within and/or supported by display portion 14a. [Formable display unit 18a is discussed in further detail below in FIG. 1B]. Motion input element 16a may be disposed within/on and/or supported by display portion 14a. As illustrated in FIG. 1A, wearable electronic device 10a may be worn on a user's wrist 20.

A user may interact with wearable electronic device 10a to create multidimensional designs, messages, noted, etc. in the formable material layer of formable display unit 18a. As referred to herein in the present disclosure, designs, messages, notes, pictures, etc. may be collectively referred to as 'designs.' The user's interactions may be registered by motion input element 16a, which can include circuitry, logic, etc. associated thereto to detect the interactions. Based on the interactions, the formable material layer may be manipulated in one or more directions (e.g., upward or downward) using the plurality of control elements of formable display unit 18a to create a design in the formable material layer that corresponds to the user's interactions.

In one or more embodiments, the formable material layer of wearable electronic device 10a can be made of a shape memory alloy (SMA). As used herein in the present disclosure, a formable material layer made of an SMA may be referred to as an SMA formable material layer. In general SMAs, which are sometimes referred to muscle wire or smart metal, are alloys with austenitic/martensitic phase transition properties that can be reset from a deformed shape back to a default shape by heating the SMA. An SMA can hold a deformed shape until it is reset back to its default shape. A default shape may be 'set' for an SMA formable material layer using various annealing processes. In one or more embodiments an SMA formable material layer can of being deformed by both bending and stretching actions. In one or more embodiments, a current may be applied to an SMA formable material layer to heat the SMA formable material layer, thereby causing it to reset back to its default shape. In one or more embodiments, SMA formable material layers can be formed of various alloys, including but not limited to, Nickel and Titanium; Copper, Zinc and Aluminum alloys; Copper, Zinc and Aluminum alloys or other alloys which may contain Zinc, Copper, Gold and/or Iron.

In one or more embodiments, a design created in an SMA formable material layer of formable display unit 18a can be stored in wearable electronic device 10a, communicated to other wearable electronic devices that may include a formable display unit and/or communicated to other electronic devices (e.g., mobile phones, laptops, tablets, notebooks, netbooks, computers or the like) for storage, sharing and/or recreation of the design on other devices that may include a formable display unit. In one or more embodiments, designs can be also made using software configured on other electronic devices (e.g., a software application configured facilitate to make designs) that may or may not include a formable display unit. The designs can be communicated to wearable electronic device 10a and recreated on formable display unit 18a.

In one or more embodiments, strap portion 12a, may be of a continuous design (e.g., having a set length, as shown in FIG. 1A) or may be of a latched design (e.g., having adjustable length) and can include links, hinges, chains, cables, weaves, a clamshell design, combinations thereof or the like. For latched designs, strap portion 12a could include a latch portion such as latch portion 44a shown in FIG. 1A, which could be configured as a buckle-type latches, a pressure-type latch, hook-type latch, clasp-type latch, magnetic-type latch, ratchet-type latch, ties, Velcro™ type latch, pin-type latch, electronic latch, combinations thereof or the like. In one or more embodiments, strap portion 12a may be made of one or more materials including metal and metal alloys (e.g., stainless steel, aluminum, tin, iron, gold, silver, platinum, titanium, etc.), natural fabrics, synthetic fabrics, fibers and blends thereof (e.g., cotton, polyester, nylon, satin, silk, wool, leather, etc.), polymers, plastics, rubbers, elastics, neoprene, carbon fiber, injection molding, silicone, polycarbonates, vinyl, polypropylene, polystyrene, polyethylene, combinations thereof or the like. In one or more embodiments, strap portion 12a may be covered by a covering, which can be made of natural fabrics, synthetic fabrics, fibers and blends thereof (e.g., cotton, polyester, nylon, satin, silk, wool, leather, etc.), polymers, plastics, neoprene, rubbers, elastics, elastomers, silicone, polycarbonates, vinyl, polypropylene, polystyrene, polyethylene combinations thereof or the like. In various embodiments, strap portion 12a may range in length from approximately 5 inches (127 mm) to approximately 10 inches (254 mm) and may range in width from approximately 8 mm to 4 inches, although other dimensions are certainly encompassed by alternative embodiments of the present disclosure.

In more general terms, strap portion 12a can be constructed having varying overall lengths, latched designs, non-latched designs, coverings, no coverings, etc. to accommodate securing wearable electronic device 10a to a variety of different users, which may have a range of different body proportions, etc. and/or a variety of different user body parts (e.g., wrists, arms, ankles etc.) which may have a range of different corresponding sizes. Further, the construction of strap portion 12a can be varied for use in different environments, wet, dry, cold, hot, etc. The ornamental design and material construction of strap portion 12a can be adjusted in any manner to suit any designer, manufacturer and/or vendor without departing from the scope of the embodiments described in the present disclosure. The ornamental design and material construction of strap portion 12a can be adjusted in any manner to suit any designer, manufacturer and/or vendor without departing from the scope of the embodiments described in the present disclosure.

In one or more embodiments, display portion 14a can be made of one or more materials including metal and metal alloys (e.g., stainless steel, aluminum, tin, iron, gold, silver, platinum, titanium, etc.), polymers, plastics, carbon fiber, injection molding, fiberglass composites, combinations thereof or the like. Display portion 14a may a length ranging from approximately one-fifth to approximately nine-tenths of the overall length of strap portion 12a and may have a width ranging from approximately one-third of the width of strap portion 12a to an approximately equal width of strap portion 12a.

In one or more embodiments, motion input element 16a can include an infrared light projector and an optical sensor to register one or more interactions (e.g., motion, gestures, etc.) with formable display unit 18a. In one or more embodiments, the infrared light projector can project infrared light (non-visible) into a predetermined area for formable display unit 18a and the optical sensor can receive reflections of the infrared light for one or more interactions with display unit 18a. In one or more embodiments, wearable electronic device 10a may include motion control logic, which may determine and output coordinate data based on the one or more interactions. In one or more embodiments, wearable electronic device 10a may include formable display control logic, which may receive the coordinate data and may manipulate the SMA formable material layer of formable display unit 18a in one or more directions based on the coordinate data. A more detailed discussion of the coordinate data is provided herein, below.

In some cases, interactions with formable display unit 18a can include a finger, stylus or the like being dragged along formable display unit 18a to create a design. In other cases, interactions with formable display unit 18a can include a finger stylus or the like being manipulated in an area above formable display unit 18a, which can be registered by motion input element 16a.

In one or more embodiments, a bendable capacitive touch screen may be configured overlaying formable display unit 18a in order to detect touch inputs to formable display unit 18a. In one or more embodiments, a bendable capacitive touch screen may be used in conjunction with a motion input element or may be used alone without a motion input element to detect touch inputs.

In one or more embodiments, wearable electronic device 10a can include wireless communication circuitry (e.g., Wi-Fi module, Bluetooth™ module, near field communication (NFC) module, or other wireless communication circuitry) to allow wearable electronic device 10a to communicate with one or more other electronic devices (wearable or not wearable) or a network through a wireless connection. The wireless connection may be any 3G/4G/LTE cellular wireless connection, WiFi/WiMAX connection, Bluetooth™ connection, or some other similar wireless connection. In an embodiment, a plurality of antennas can be provisioned in conjunction with wearable electronic device 10a, which may be associated with wireless connection activities. Communications can also made using wired connections, as discussed herein, below.

In various embodiments, display portion 14a can include a port 40 to facilitate charging a battery or capacitor, communication and/or control of the wearable electronic device 10a. For example, electrical current and signals can be passed through a plug-in connector (e.g., whose male side protrusion connects to port 40 and whose female side connects to a power device or another electronic device or vice-versa) or a wireless connector (e.g., WiFi, Bluetooth™, etc.) to recharge an on-board battery or capacitor and/or provide a communication path to electronics in wearable electronic device 10a. Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10a. [Thunderbolt™ and the Thunderbolt logo are trademarks of Intel Corporation in the U.S. and/or other countries.]. Virtually any other electrical connection means and methods could be used and, thus, are clearly within the scope of the present disclosure. Port 40 may be configured on any side of display portion 14a. In some embodiments, wearable electronic device 10a may include charging contacts configured on display portion 14a and/or strap portion 12a, which can be used in combination with a charging device to facilitate charging a rechargeable battery within wearable electronic device 10a.

In one or more embodiments, display portion 14a can include a touch input element 30 or, in some embodiments, multiple touch input elements, which may be configured to detect touch inputs to control various functions of wearable electronic device 10a. In one or more embodiments, touch input element 30 may be implemented as a multifunction button, switch, slider, lever, capacitive or resistive touch surface, combinations thereof or the like. In one or more embodiments, touch input element 30 may be configured on any part of display portion 14a either together or separated as determined by a designer.

The location and/or configuration of input element 30, port 40 and motion input element 16a (and 16b and 16c, discussed below) as shown in FIG. 1A is provided for illustrative purposes only. It should be understood that different configurations these elements (e.g., placement, configuration, size, etc.) are certainly encompassed by alternative embodiments of the present disclosure.

In one or more embodiments, wearable electronic device 10a may include a microphone or other audio input device and operations for wearable electronic device may be controlled by one or more commands provided by a user. The commands may be received by the microphone or audio input device, which may be coupled to appropriate circuitry, voice recognition logic, etc. to initiate one or more operations for wearable electronic device. In one or more embodiment, certain gestures could be registered by motion input element 16 and used to initiate one or more operations for wearable electronic device 10a. In one or more embodiments, motion control logic in wearable electronic device 10a may be configured to distinguish control gestures from interactions that may be used to create designs using formable display unit 18a.

Figure 1B:
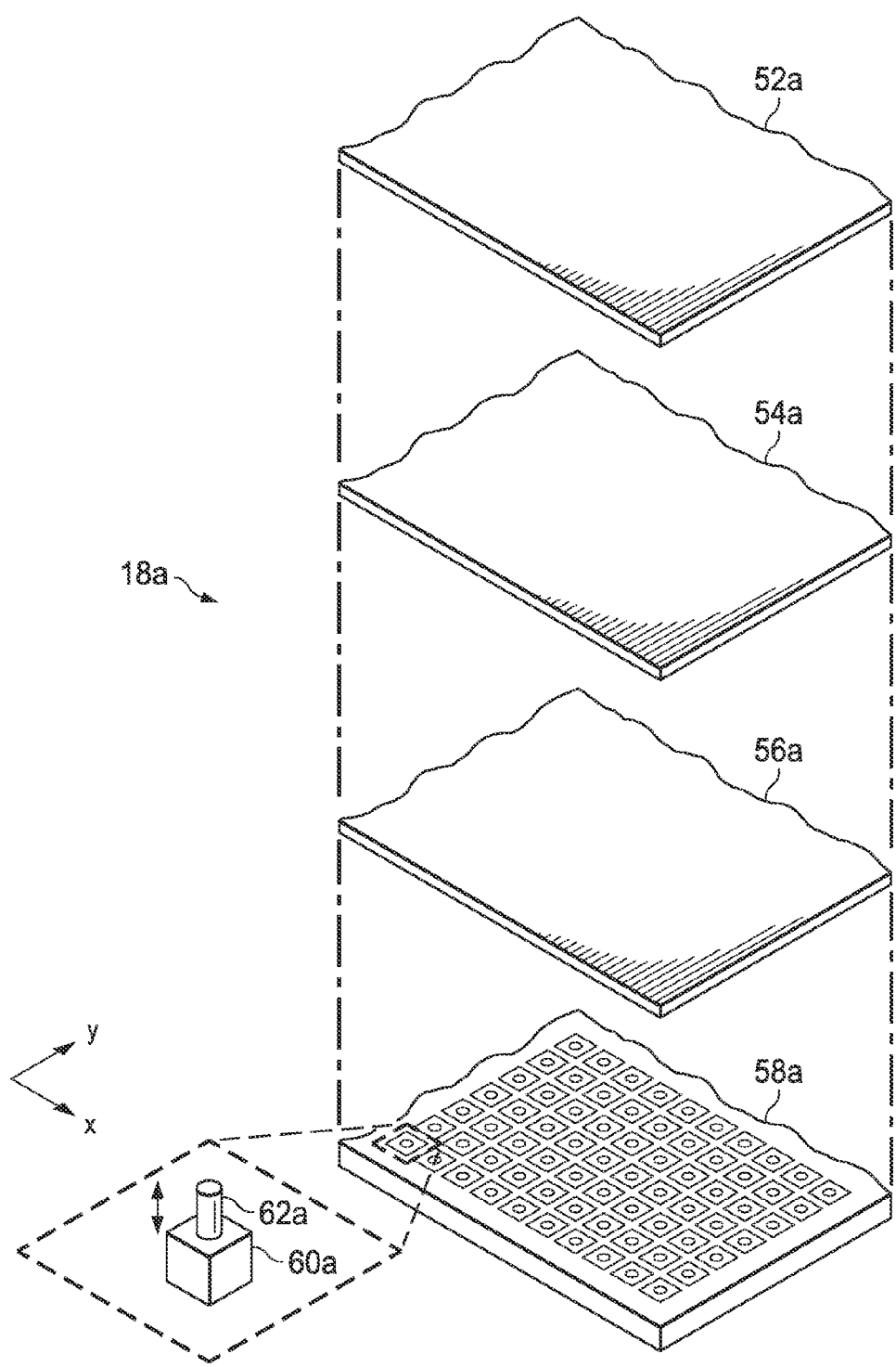
FIG. 1B is a simplified exploded partial view illustrating an embodiment of a formable display unit of a wearable electronic device, in accordance with one embodiment of the present disclosure.

Turning to FIG. 1B, FIG. 1B is a simplified exploded partial view illustrating an embodiment of formable display unit 18a of wearable electronic device 10a in accordance with an embodiment of the present disclosure. As illustrated in FIG. 1B, formable display unit 18a can include a first insulating layer 52a, a SMA formable material layer 54a (e.g., made of an SMA material), a second insulating layer 56a and a control layer 58a. Control layer 58a can include a plurality of control elements, which may be implemented as micro actuators 60a, arranged in an X-Y array within/on control layer 58a. First insulating layer 52a may be affixed to a top surface of SMA formable material layer 54a and second insulating layer 56a may be affixed to a bottom surface of SMA formable material layer 54a.

In one or more embodiments, SMA formable material layer 54a may range in thickness from approximately 100 µm to approximately 11.5 mm, although other dimensions are certainly encompassed by alternative embodiments of the present disclosure. In one or more embodiments, SMA formable material layer 54a may be formed to have a default shape (e.g., a default flat position) having a flat surface, which may extend across the display area for formable display unit 18a.

In one or more embodiments, first and second insulating layers 52a and 56a can be made of latex, plastic, silicone, rubber, polymers of any kind, including elastomeric polymers, etc. First and second insulating layers 52a and 56a can be configured as films, membranes or coatings that may be affixed to SMA formable material layer 54a. In one or more embodiments, first and second insulating layers 52a and 56a can range in thickness from approximately 50 µm to approximately 5 mm.

In one or more embodiments, micro actuators 60a (e.g., control elements) can each include an actuator shaft 62a capable of actuating in a first and a second direction (e.g., up and down). Each actuator shaft 62a of each micro actuator 60a may be affixed to second insulating layer 56a to facilitate manipulating SMA formable material layer 54a in one or more directions. Formable display control logic in wearable electronic device 10a may manipulate SMA formable material layer 54a based on coordinate data associated with one or more interactions with formable display unit 18a.

Each micro actuator 60a may have its corresponding shaft 62a coupled to second insulating layer at a stroke position such that the shaft 62a may be at approximately mid-stroke between being fully extended and fully retracted for the default (e.g., flat) position of SMA formable material layer 54a. In this manner, micro actuators 60a may be capable of pulling SMA formable material layer 54a in a downward direction and pushing it in an upward direction. In one or more embodiments, micro actuators 60a may have a length/width or diameter (depending on form factor) of approximately 1 mm, although other dimensions are certainly encompassed by alternative embodiments of the present disclosure as the overall stroke may vary with the dimensions of display portion 14a (and 14b, discussed below). In one or more embodiments, micro actuators 60a may have an overall stroke that may vary in an approximate range of 4 mm-10 mm, although other overall strokes are certainly encompassed by alternative embodiments of the present disclosure as the overall stroke may vary with the dimensions of display portion 14a (and 14b, discussed below). In one or more embodiments, the micro actuators can be wax actuators.

In general, wearable electronic device 10a can include formable display unit 18a having SMA formable material layer 54a, which can be manipulated in one or more directions using micro actuators 60a (e.g., control elements) arranged on control layer 58a. In one or more embodiments, motion input element 16a may register one or more interactions with formable display unit, which can include, but not be limited to, a user dragging a finger along formable display unit 18a. Motion control logic in wearable electronic device 10a can determine and output coordinate data based on the interactions. Formable display control logic in wearable electronic device 10a receive the coordinate data and may manipulate SMA formable material layer 54a in one or more directions based on the coordinate data, which may create a design in SMA formable material layer 54a that corresponds to the user's interactions.

In one or more embodiments, the design can be stored in wearable electronic device 10a or communicated to another electronic device using wireless communication circuitry within wearable electronic device 10a. In one or more embodiments, the design can be shared with another user that may also have a wearable electronic device including a formable display unit and the design may be recreated on the other user's wearable electronic device.

For purposes of illustrating certain example features of electronic devices 10a (and 10b and 10c, discussed below) the following foundational information may be viewed as a basis from which the present disclosure may be properly explained. Electronic devices typically include an electronic graphical display, which may provide a user the ability to interact with features and/or applications of an electronic device. Communication with electronic devices is often limited to text messages, text notes, emails, etc. There exist certain graphical elements such icons, emotional icons (e.g., 'emoticons'), etc. that can be included in messages, but these are often merely a closed set of static icons that cannot be modified or customized. Thus, messages formed using current electronic devices and traditional methods of communication are often one-dimensional and cannot be customized. By limiting users to such forms of communication, user experience and immersion with their electronic devices can be limited.

Particular embodiments described herein provide for a wearable electronic device such as an electronic bracelet, watch, wristband, armband, anklet, etc. that includes a circuit board coupled to a plurality of electronic components (which includes any type of components, elements, circuitry, etc.). In certain embodiments, the circuit board may be a flexible printed circuit board. In at least one example embodiment, the wearable electronic device can include a formable display unit having a formable material layer that can be manipulated in one or more directions using various means. A user may create and/or save customized multidimensional messages, notes, designs, etc. using the formable display unit containing the formable material layer. Thus, the wearable electronic device can enhance user experience and immersion with the wearable electronic device. The numbers of designs that can be created using the wearable electronic device are virtually limitless.

Further, the wearable electronic device provides for communicating customizable designs between users, which can even further enhance user experience and immersion, and, in some cases, may create an emotional link between users communicating designs using such devices. A user can share designs created using the wearable electronic device with one or more other users (e.g., friends, family members, co-workers, etc.) using wireless communication circuitry within the wearable electronic device.

In use, a user may interact with formable display unit 18a to create a design in SMA formable material layer 54a. As noted above interactions can be, for example, a finger, stylus or the like dragged along formable display unit 18a to create a design in SMA formable material layer 54a. In other cases, interactions can be made in a predetermined area above formable display unit 18a using a finger stylus or the like to create a design in SMA formable material layer 54a. Motion input element 16a may register or more user interactions with formable display unit 18a and motion control logic, which can be configured in wearable electronic device 10a, may determine and output coordinate data corresponding to the interactions.

In one or more embodiments, an X-Y coordinate map for formable display unit 18a can be stored in memory of wearable electronic device 10a (and 10b discussed below), which may include data corresponding to the arrangement/spacing of micro actuators 60a (e.g., control elements) of control layer 58a in relation to the display area of formable display unit 18a. In one or more embodiments, formable display control logic in wearable electronic device 10a may manipulate, based on the coordinate data, SMA formable material layer 54a in one or more directions using one or more of micro actuators 60a. In one or more embodiments, the formable display control logic may account for the arrangement/spacing of micro actuators 60a and may accordingly adjust the coordinate data in order to control micro actuators 60a in a manner such that the manipulations of SMA formable material layer 54a accurately track interactions registered by the motion input controller.

In one or more embodiments, the manipulations may include manipulating SMA formable material layer 54a in a first direction from a first position (e.g., its default flat position) to a second position (e.g., a deformed position) using one or more of micro actuators 60a of control layer 58a, thereby creating a design in SMA formable material layer corresponding to the user's interactions. In one or more embodiments, the deformed position may be held, either by micro actuators 60a or may be held by SMA formable material layer 54a itself. Recall, that an SMA may hold a deformed shape until reset back to its default shape upon an application of current to the SMA. Thus, SMA formable material layer 54a, in certain embodiments, may hold the deformed shape until reset. This may mean, in certain embodiments, that power to micro actuators 60a may be removed following manipulating SMA formable material layer 54a to the deformed.

Formable display control logic in wearable electronic device 10a may manipulate SMA formable material layer 54a in a second direction back to its default flat position by applying a current to SMA formable material layer 54a from a current source (e.g., a battery, capacitor, circuitry, etc.) within wearable electronic device 10a. In one or more embodiments, the current may range, for example, from approximately 40 mA to approximately 4000 mA, which can vary based on alloy, thickness, length, shape, etc. of SMA formable material layer 54a. In one or more embodiments, formable display control logic in wearable electronic device 10a may apply the current for a predetermined period of time until SMA formable material layer is reset back to its default flat position. The predetermined period of time can be set by a manufacturer and may vary based on alloy, thickness, length, shape, etc. of SMA formable material layer 54a. In one or more embodiments, the predetermined period of time may be within an approximate range of 1 s to 10 s, although other times are certainly encompassed by alternative embodiments of the present disclosure. The predetermined period of time should be sufficient to allow SMA formable material layer 54a to reset back to its default shape but not overheat the wire, which may damage strap portion 12a, SMA formable material layer 54a or any electronics within wearable electronic device 10a. Additionally, in one or more embodiments, the predetermined period of time may be adjusted based on the amount of current applied to SMA formable material layer 54a and/or any other variable related to the construction of wearable electronic device 10a, including the alloy, thickness, length, shape, etc. of SMA formable material layer 54a. For any alternative embodiments including any SMA formable material layer, the predetermined period of time may be adjusted in a similar manner.

In one or more embodiments, a user may initiate resetting SMA formable material layer 54a by pressing one or more of input elements 30(1)-(3). In one or more embodiments, wearable electronic device 10a may include a microphone or other audio input device and formable material layer could be reset by a user providing voice commands to wearable electronic device 10a. The commands could be received by the microphone or audio input device, which could be coupled to appropriate circuitry, voice recognition logic, etc. to initiate resetting SMA formable material layer 54a. In one or more embodiments, certain gestures could be registered by motion input element 16 and used to initiate resetting SMA formable material layer 54a.

In one or more embodiments, SMA formable material layer 54a may be pushed up or pulled down to create a design therein. In one or more embodiments, SMA formable material layer 54a may be manipulated in a first direction for the path of an interaction and for an area around the path may be manipulated in a second direction opposite the first direction. In this manner, wearable electronic device 10a can enhance the multidimensional characteristics of a design.

In one or more embodiments, electronics (e.g., processors, controllers, memory, etc.) for wearable electronic device 10a may reside in display portion 14a. In another embodiment, electronics (e.g., processors, controllers, memory, etc.) can also reside in strap portion 12a. In an embodiment, wearable electronic device 10a may contain a camera, a microphone, and/or a speaker.

In other embodiments, other electronic devices such as a mobile device, a tablet computer and/or a tablet device (e.g., i-Pad™), phablet (e.g., phone-tablet hybrid), a personal digital assistant (PDA), a smartphone, an audio system, a movie player of any type, or other device that includes a circuit board coupled to a plurality of electronic components (which includes any type of components, elements, circuitry, etc.) can include a formable display unit.

In at least one example embodiment, the circuit board of wearable electronic device 10a is a general circuit board that can hold various components of an internal electronic system of wearable electronic device 10a. The components may include a central processing unit (CPU), a memory, etc. The circuit board can also couple to one or more connectors in order to accommodate other peripherals sought to be used by a user of wearable electronic device 10a. More specifically, the circuit board can provide the electrical connections by which the other components of the system can communicate.

Any processors (inclusive of digital signal processors, microprocessors, supporting platform hardware, etc.), memory elements, etc. can be suitably coupled to the circuit board based on particular configuration needs, processing demands, electronic device designs, etc. Note that particular embodiments of the present disclosure may readily include a system on chip (SOC) central processing unit (CPU) package. An SOC represents an integrated circuit (IC) that integrates components of a computer or other electronic system into a single chip. The chip may contain digital, analog, mixed-signal, and often radio frequency functions: all of which may be provided on a single chip substrate.

Note also that particular embodiments of the present disclosure may include logic that can be implemented in a variety of manners. For example, logic can be implemented in software, which may mean that a processor may be instructed to detect or capture one or more interactions with formable display unit 18a, to determine coordinate data from the interactions, to manipulate SMA formable material layer 54a of formable display unit 18a using one or more control elements (e.g., micro actuators 60a), to communicate designs using wireless communication circuitry, etc. In another example, logic can be implemented in firmware that a separate device may utilize. In yet another example, logic can be implemented as a standalone hardware chip controller.

Figure 2A:
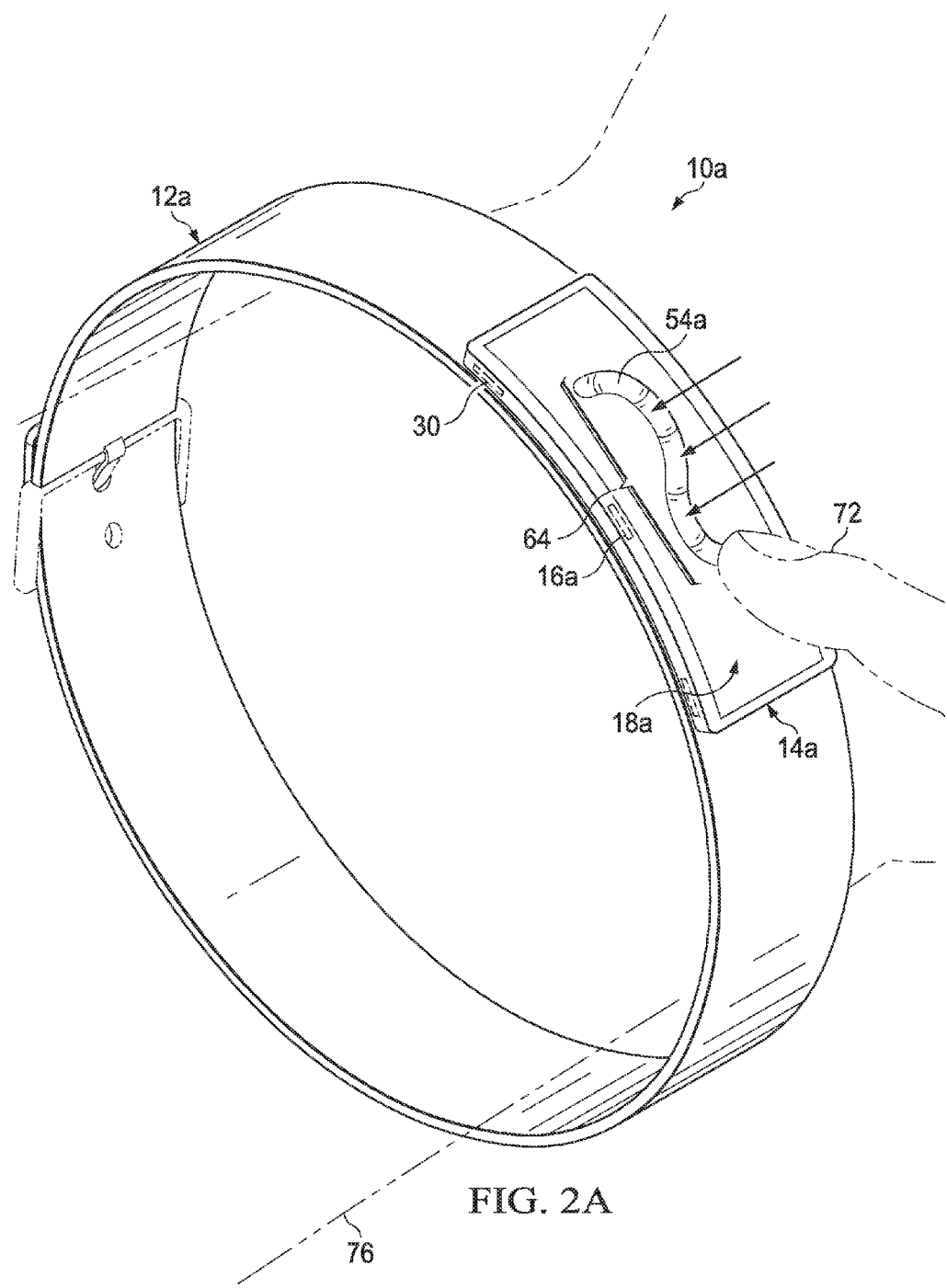
FIG. 2A is a simplified orthographic view illustrating an embodiment of a wearable electronic device, in accordance with one embodiment of the present disclosure.

Turning to FIG. 2A, FIG. 2A is a simplified orthographic view illustrating an embodiment of wearable electronic device 10a in accordance with one embodiment of the present disclosure. Wearable electronic device 10a can include strap portion 12a and display portion 14a. Display portion 14a can include motion input element 16a, formable display unit 18a. In one or more embodiments, display portion 14a can include one or more touch input element 30. As shown in FIG. 2A, wearable electronic device may be worn on a user's wrist 76 and the user may drag a finger 72 along formable display unit 18a to create a design 64 in SMA formable material layer 54a.

In one or more embodiments, the user can provide touch inputs to touch input element 30 (or multiple touch input elements if configured therewith) to initiate motion input element 16a to register the interactions of the finger 72 with formable display unit 18a. In one or more embodiments, motion input element 16a may be initiated by detecting motion and waking from a sleep or standby state. In one or more embodiments, voice commands may be used to initiate motion input element. In one embodiment, wearable electronics device 10a can include one or more haptic elements (e.g., linear resonant actuators (LRAs), eccentric rotating mass (ERM) actuators, piezoelectric elements, etc.) to generate a haptic alert (e.g., vibration) indicating that the device is ready to capture one or more interactions. Virtually any other alerts could be used, which could be preprogrammed or set based on user preference for wearable electronic devices as described herein in the present disclosure and, thus, are clearly within the scope of the present disclosure.

In one or more embodiments, the user may also provide touch inputs to touch input element 30 or multiple touch input elements to set a direction (e.g., up or down) for manipulating SMA formable material layer 54a in order to create a design therein. As shown in FIG. 2A, the user may interact with formable display unit 18a by dragging finger 72 along formable display unit 18a. In one or more embodiments, motion input element 16a may register the interactions and motion control logic in wearable electronic device 10a may determine and output coordinate data corresponding to the interactions. Formable display control logic in wearable electronic device 10a may receive the coordinate data and may manipulate SMA formable material layer 54a, based on the coordinate data, in a first direction (e.g., down for the present example) using control elements within formable display unit 18a (e.g., micro actuators) to a first deformed position along the path/locations where user's finger 72 is dragged to create design 64.

In one or more embodiments, formable display control logic in wearable electronic device can also manipulate, based on the coordinate data, other control elements around or near the path of user's finger in an upward direction opposite the downward direction for the design 64 in order to push up SMA formable material layer 54a in those corresponding areas. In this manner, wearable electronic device can enhance the multidimensional effects of a design created on formable display unit 18a. Note, pushing up SMA formable material layer 54a around design 64 is not shown in FIG. 2A.

In one or more embodiments, the user may store design 64 in wearable electronic device. In one or more embodiments, provide touch inputs to touch input element 30 or multiple touch input elements to initiate storing design 64 in wearable electronic device 10a. In one or more embodiments, wearable electronic device 10a could include a microphone or other audio input device and design 64 may be saved by a user providing voice commands to wearable electronic device 10a. The commands could be received by the microphone or other audio input device, which could be coupled to appropriate circuitry, voice recognition logic, etc. that may communicate with other logic to control storing design 64 in wearable electronic device 10a. In another embodiment, gestures or interactions could be registered by motion input element 16 and used to initiate storing design 64 in wearable electronic device 10a. In an embodiment, system control logic in wearable electronic device 10a may generate a haptic effect that may indicate that a design is saved.

In one or more embodiments, the user may communicate design 64 to one or more other electronic devices. For example, in one or more embodiments, the design 64 can be communicated using wireless communication circuitry in wearable electronic device 10a by providing touch inputs to touch input element 30 or multiple touch input elements. In one or more embodiments, wearable electronic device 10a could include a microphone or other audio input device and the design 64 can be communicated to another device by a user providing voice commands to wearable electronic device 10a. The commands could be received by the microphone or other audio input device, which could be coupled to appropriate circuitry, voice recognition logic, etc. that may interface with other logic to communicate design 64 to another electronic device using wireless communication circuitry in wearable electronic device 10a. In another embodiment, gestures or interactions could be registered by motion input element 16 and used to initiate communicating design 64 to another device using wireless communication circuitry in wearable electronic device 10a. In one or more embodiments, the other electronic device could be a mobile phone, laptop, etc. which could be used to save design 64 or to communicate design 64 to another user's wearable electronic device having a formable display unit included therein. By communicating design 64, it is meant that coordinate data for design 64 may be communicated to another electronic device.

In one or more embodiments, wearable electronic device 10a can include memory to store user preferences (e.g., phone numbers, access keys, etc.) for one or more electronic devices that a user may desire to send designs to using wireless communication circuitry within wearable electronic device 10a.

Figure 2B:
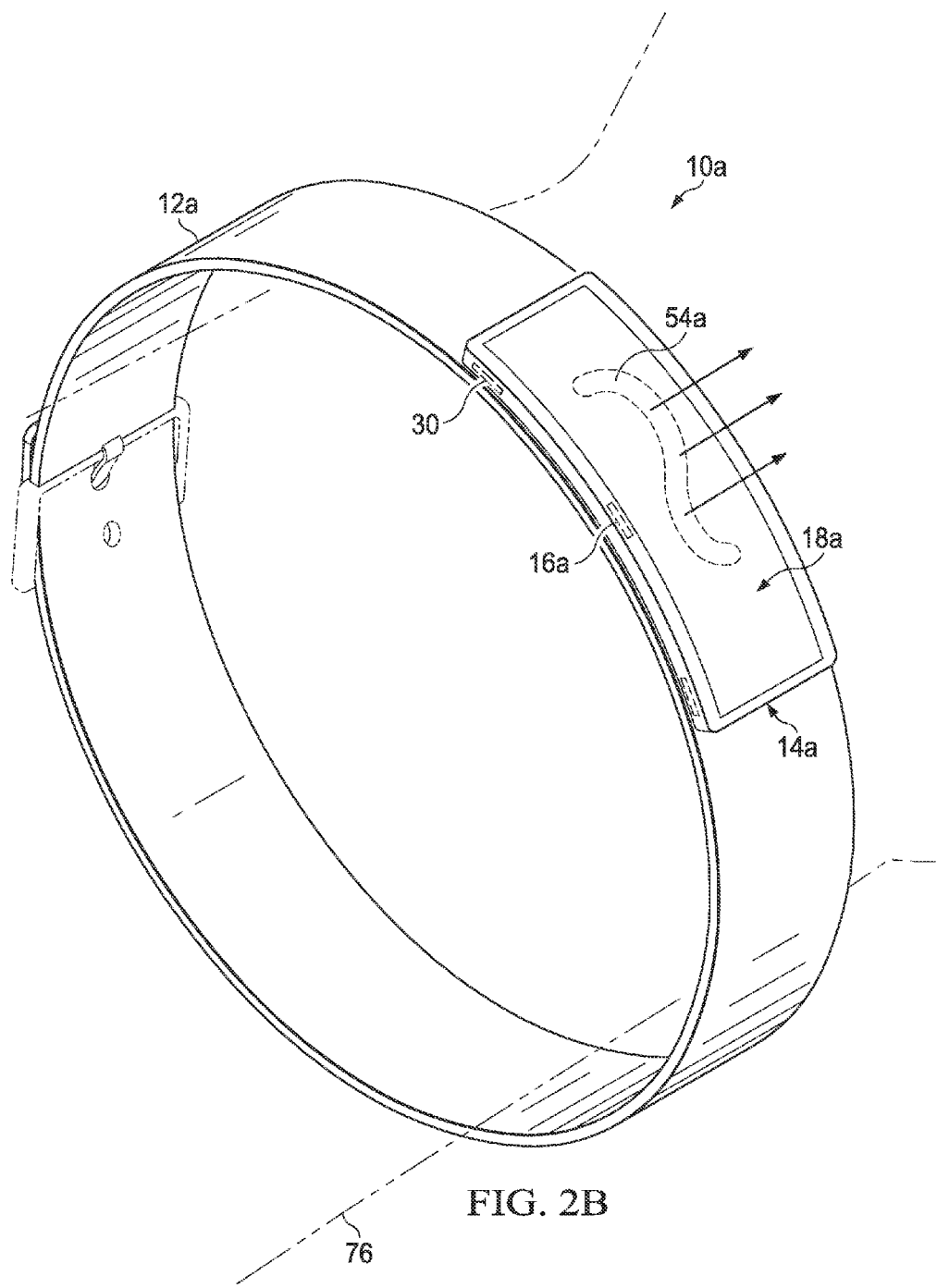
FIG. 2B is a simplified orthographic view illustrating an embodiment of the wearable electronic device of FIG. 2A, in accordance with one embodiment of the present disclosure.

Turning to FIG. 2B, FIG. 2B is a simplified orthographic view illustrating an embodiment of the wearable electronic device 10a of FIG. 2A in accordance with one embodiment of the present disclosure. Wearable electronic device 10a can include strap portion 12a and display portion 14a. Display portion 14a can include motion input element 16a and formable display unit 18a, which may include SMA formable material layer 54a. In one or more embodiments, display portion 14a can include a touch input element 30 or in some embodiments, multiple touch input elements. Formable display unit 18a can include SMA formable material layer 54a, which had design 64 of FIG. 2A formed therein (the dashed outline indicates where design 64 was previously created).

The user may initiate resetting SMA formable material layer 54a using any of the means described above. In one or more embodiments, in response to one or more interactions (e.g., touch inputs, voice commands, gestures, etc.) by the user, formable display control logic in wearable electronic device 10a may apply a current to the SMA formable material layer 54a to reset it from the deformed position back to its default flat position. SMA formable material layer 54a may pull the shafts of the micro actuators along design 64 up as it resets back to its default flat position. In an embodiment where control elements around the design 64 were pushed up to enhance the multi-dimensional effects of a design, SMA formable material layer 54a may pull the shafts of corresponding actuators that were previously up, back down again. In one or more embodiments, formable display control logic in wearable electronic device 10a may apply the current for a predetermined period of time until SMA formable material layer is reset back to its default flat position. In one or more embodiments, the predetermined period of time can be set by a manufacturer and may vary based on alloy, thickness, length, shape, etc. of SMA formable material layer 54a.

In one or more embodiments, formable display control logic in wearable electronic device 10a may deactivate the micro actuators within formable display unit 18a upon a user initiating a reset of SMA formable material layer 54a or may deactivate the micro actuators after design 64 may be created. As noted, SMA formable material layer may hold a deformed position until it may be reset back to its default flat position.

Figure 3A:
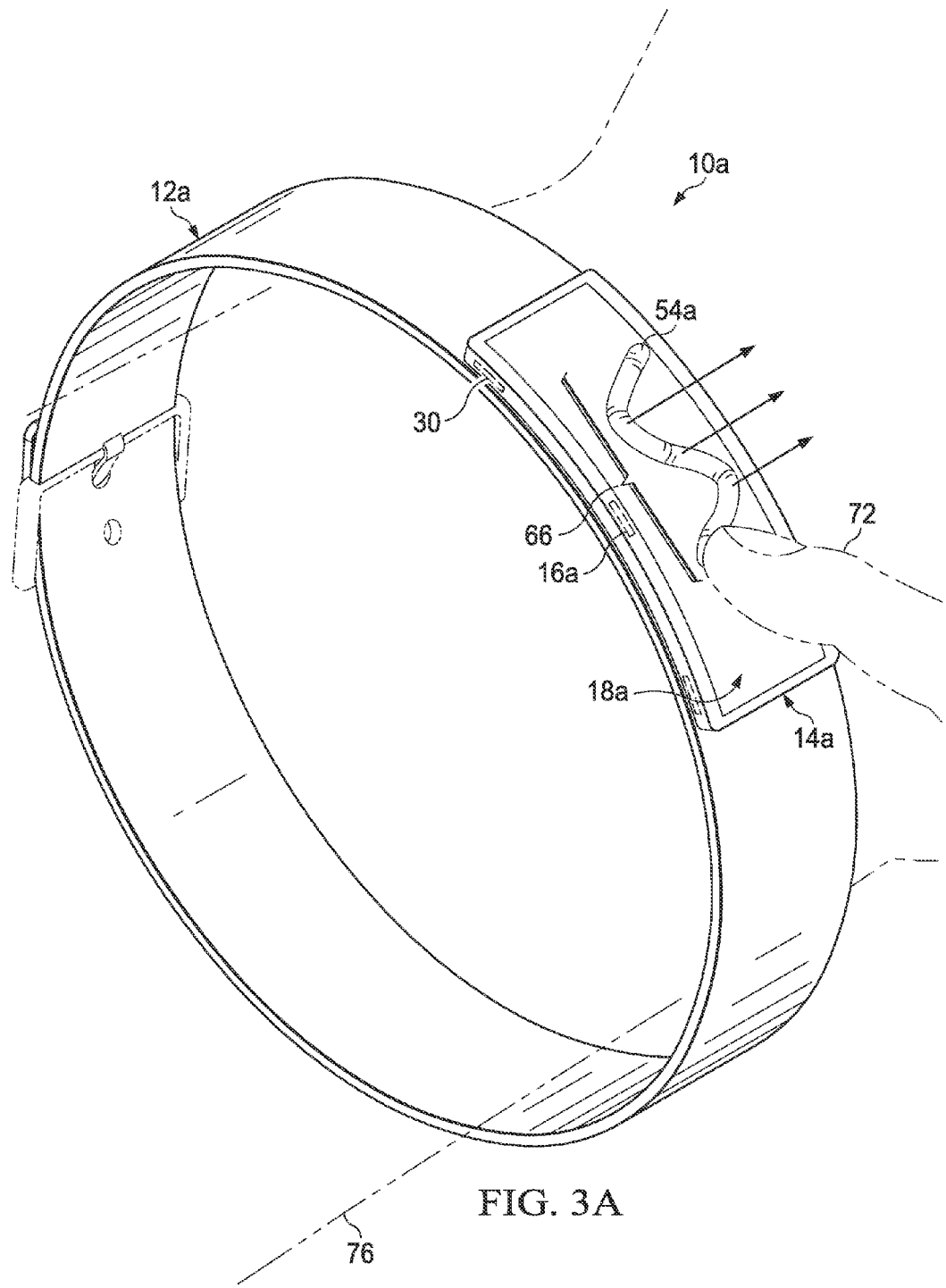
FIG. 3A is a simplified orthographic view illustrating an embodiment of a wearable electronic device, in accordance with one embodiment of the present disclosure.

Turning to FIG. 3A, FIG. 3A is a simplified orthographic view illustrating an embodiment of wearable electronic device 10a in accordance with one embodiment of the present disclosure. Wearable electronic device 10a can include strap portion 12a and display portion 14a. Display portion 14a can include motion input element 16a and formable display unit 18a, which may include SMA formable material layer 54a. In one or more embodiments, display portion 14a can include a touch input element 30, or in some embodiments, multiple touch input elements.

As shown in FIG. 3A, user's finger 72 can be dragged along a surface (e.g., first insulating layer) of formable display unit 18a to create a design 66 in SMA formable material layer 54a. Design 66 may be manipulated upward in FIG. 3A. Thus, FIG. 3A illustrates that a user can configure a design to be formed through manipulations of SMA formable material layer 54a in an upward direction or a downward direction, based on user preference. In one or more embodiments, a user can set a default design manipulation direction. The default direction could be changed by interacting with wearable electronic device 10a (e.g., touch inputs, voice commands, gestures, etc.) for certain designs.

Figure 3B:
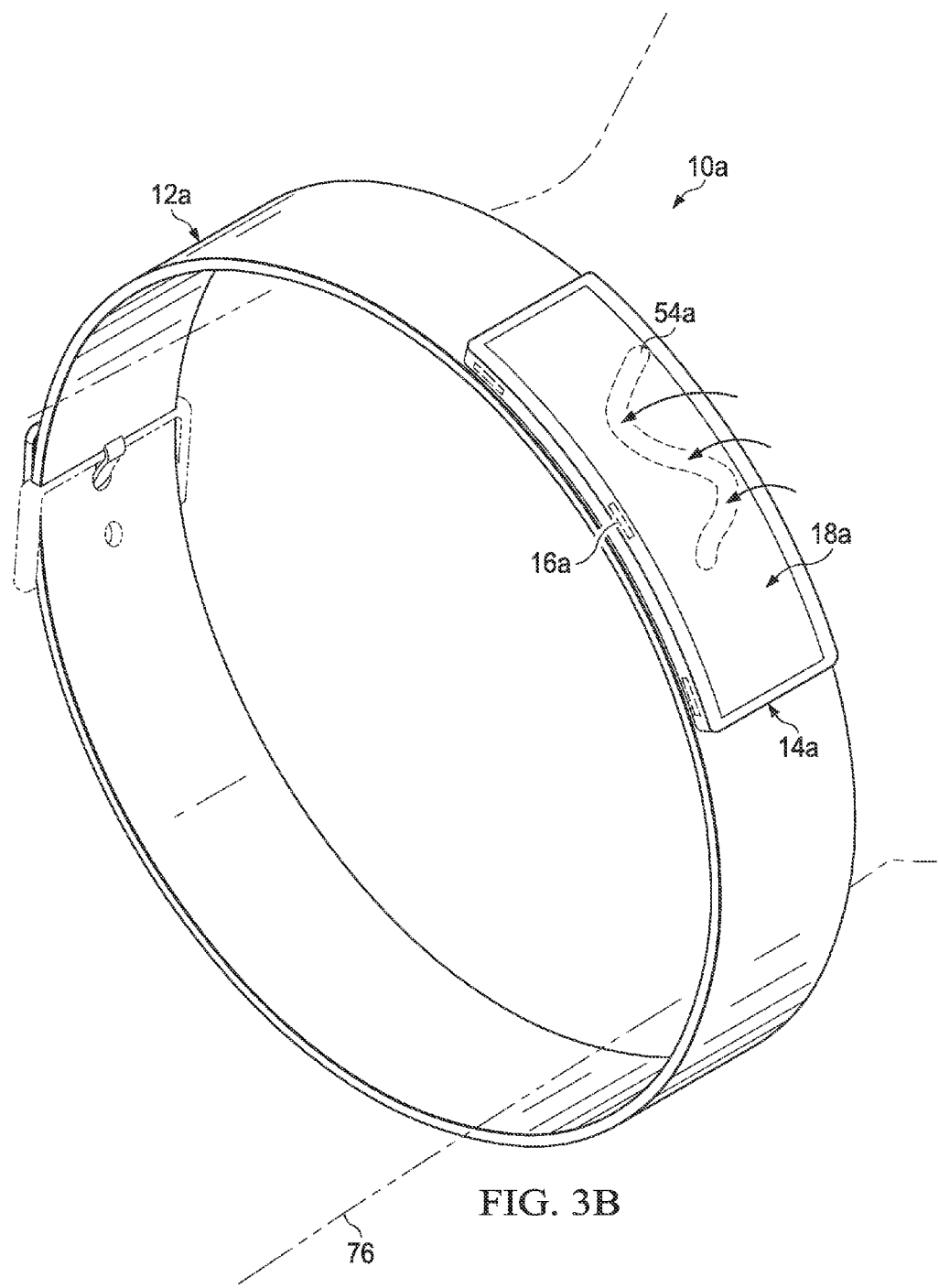
FIG. 3B is a simplified orthographic view illustrating an embodiment of the wearable electronic device of FIG. 3A, in accordance with one embodiment of the present disclosure.

Turning to FIG. 3B, FIG. 3B is a simplified orthographic view illustrating an embodiment of the wearable electronic device 10a of FIG. 3A in accordance with one embodiment of the present disclosure. Wearable electronic device 10a can include strap portion 12a and display portion 14a. Display portion 14a can include motion input element 16 and formable display unit 18a. Formable display unit 18a can include SMA formable material layer 54a, which had design 66 of FIG. 3A formed therein and is now reset to its default flat position (the dashed outline indicates where design 66 was previously created).

The user may initiate resetting SMA formable material layer 54a using any of the means described above. In response to one or more interactions (e.g., touch inputs, voice commands, gestures, etc.) by the user, formable display control logic in wearable electronic device 10a may apply a current to the SMA formable material layer 54a to reset it from the deformed position back to its default flat position. SMA formable material layer 54a may pull the shafts of the micro actuators along design 64 down as it resets back to its default flat position. In one or more embodiments, formable display control logic in wearable electronic device 10a may deactivate the micro actuators within formable display unit 18a upon a user initiating a reset of SMA formable material layer 54a may deactivate the micro actuators after design 64 may be created. As noted, SMA formable material layer 54a may hold a deformed position until it may be reset back to its default flat position. In one or more embodiments, formable display control logic in wearable electronic device 10a may apply the current for a predetermined period of time until SMA formable material layer is reset back to its default flat position.

Figure 4A:
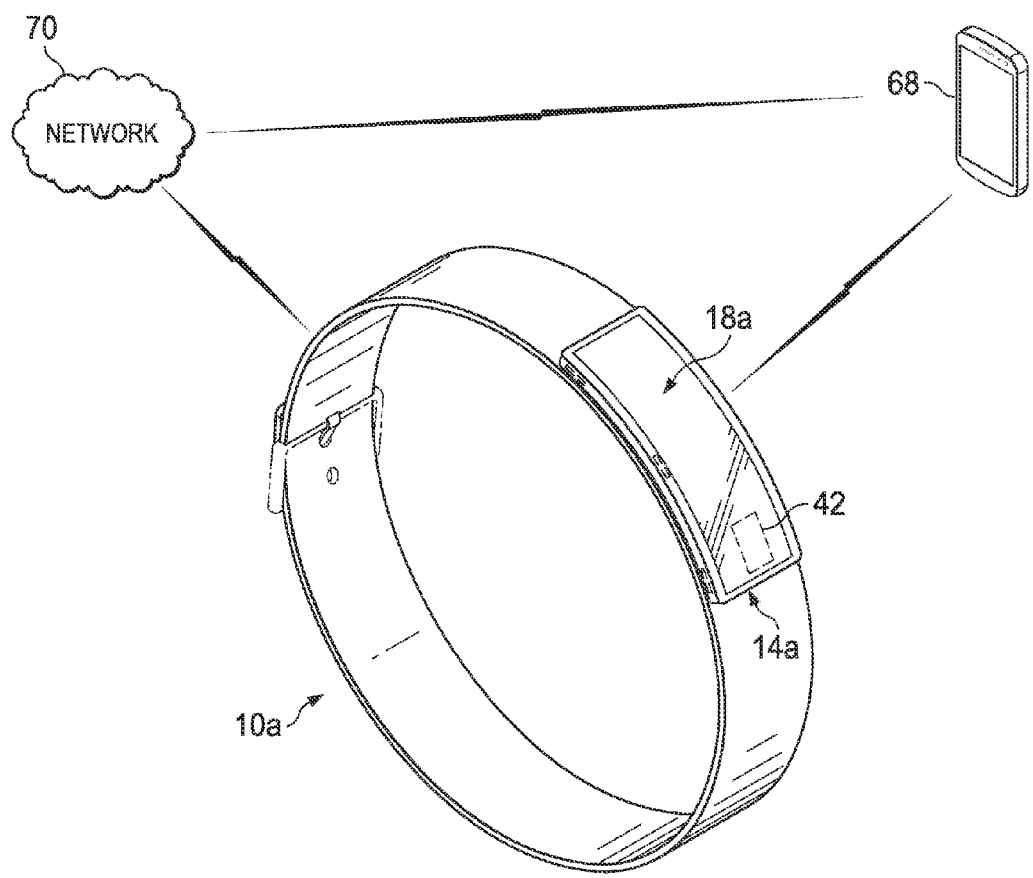
FIG. 4A is a simplified block diagram illustrating an embodiment of a wearable electronic device, in accordance with one embodiment of the present disclosure.

Turning to FIG. 4A, FIG. 4A is a simplified block diagram illustrating an embodiment of wearable electronic device 10a in accordance with one embodiment of the present disclosure. Wearable electronic device 10a can include display portion 14a, which can include formable display unit 18a and a wireless module 42. Wireless module 42 (e.g., Wi-Fi module, Bluetooth™ module, Near Field Communication (NFC) module or other wireless communication circuitry) may allow wearable electronic device 10a to communicate with a network 70 and an electronic device 68 through a wireless connection.

The wireless connection may be any 3G/4G/LTE cellular wireless, WiFi/WiMAX connection, Bluetooth™, NFC or some other similar wireless connection. In an embodiment, the wireless connection may be a wireless personal area network (WPAN) to interconnect wearable electronic device to network 70 and electronic device 68 within a relatively small area (e.g., Bluetooth™, invisible infrared light, Wi-Fi, etc.). In another embodiment, the wireless connection may be a wireless local area network (WLAN) that links wearable electronic device to network 70 and electronic device 68 over a relatively short distance using a wireless distribution method, usually providing a connection through an access point for Internet access. The use of spread-spectrum or OFDM technologies may allow wearable electronic device to move around within a local coverage area, and still remain connected network 70 and/or electronic device 68.

Network 70 may be a series of points or nodes of interconnected communication paths for receiving and transmitting packets of information that propagate through network 70. Network 70 offers a communicative interface and may be any local area network (LAN), wireless local area network (WLAN), metropolitan area network (MAN), Intranet, Extranet, WAN, virtual private network (VPN), or any other appropriate architecture or system that facilitates communications in a network environment. Network 70 can comprise any number of hardware or software elements coupled to (and in communication with) each other through a communications medium. Electronic device 68 may be a computer (e.g., notebook computer, laptop, tablet computer or device), a phablet, a cellphone, a personal digital assistant (PDA), a smartphone, a movie player of any type, router, access point, or other device that includes a circuit board coupled to a plurality of electronic components (which includes any type of components, elements, circuitry, etc.). In one or more embodiments, designs can be communicated using wireless module.

Figure 4B:
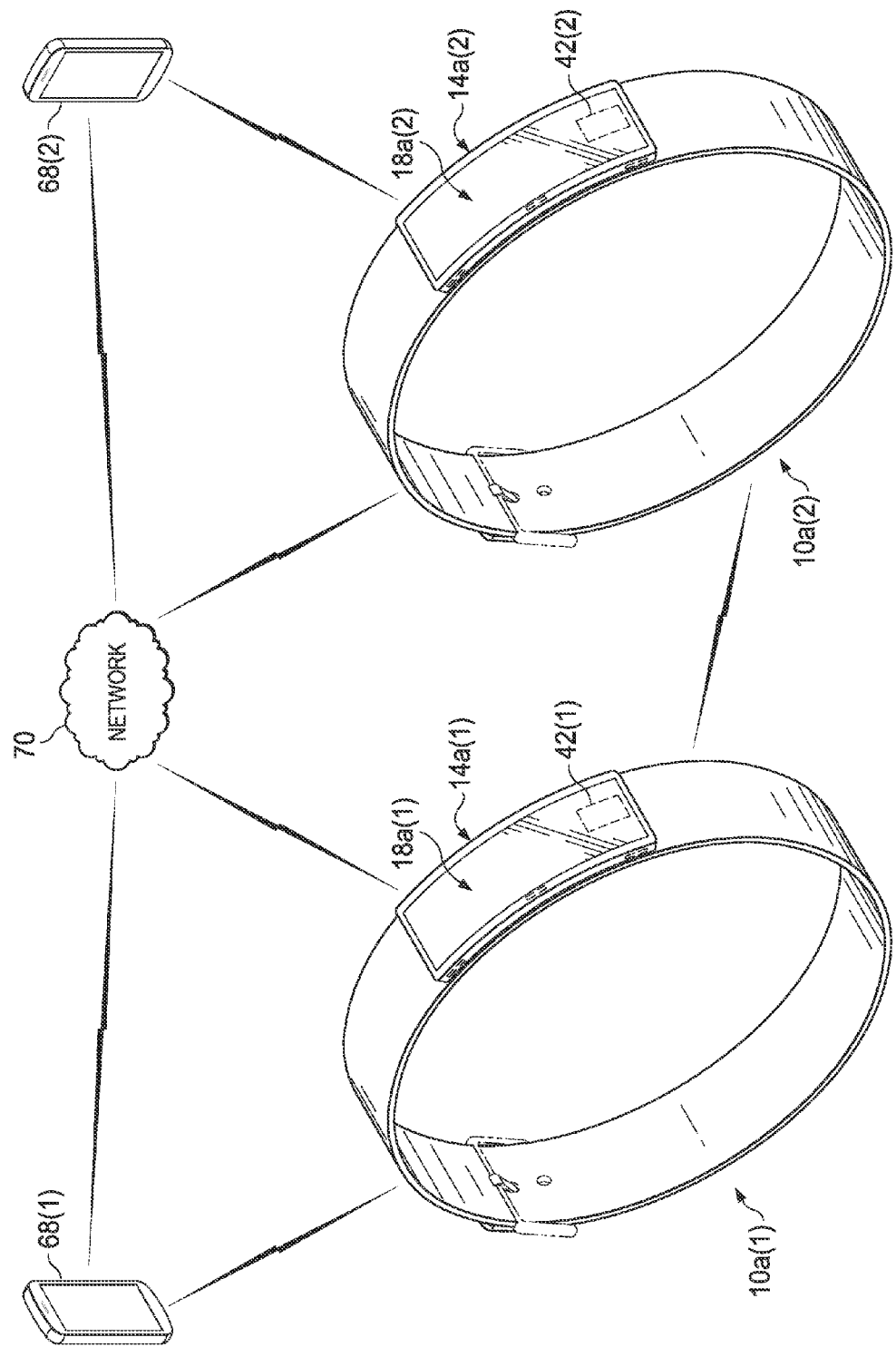
FIG. 4B is a simplified block diagram illustrating an embodiment of a pair of wearable electronic devices, in accordance with one embodiment of the present disclosure.

Turning to FIG. 4B, FIG. 4B is a simplified block diagram illustrating an embodiment of a pair of wearable electronic devices 10a(1) and 10a(2) in accordance with one embodiment of the present disclosure. A first wearable electronic device 10a(1) may include a first display portion 14a(1), which may include a first formable display unit 18a(1) and a first wireless module 42(1). A second wearable electronic device 10a(2) may include a second display portion 14a(2), which may include a second formable display unit 18a(2) and wireless module 42(2).

In one or more embodiments, first wearable electronic device 10a(1) may be capable of communicating with a first and second electronic device 68(1), 68(2) (e.g., a smartphone, cellphone, tablet, etc.), network 70 and/or second wearable electronic device 10a(2) through a wireless connection. The wireless connection may be any 3G/4G/LTE cellular wireless, WiFi/WiMAX connection, Bluetooth™, NFC or some other similar wireless connection. First wearable electronic device 10a(1) may include one or more memory elements (e.g., a subscriber identity module (SIM), random access memory (RAM), dynamic random access memory (DRAM), synchronous dynamic random access memory (SDRAM), flash memory, etc.), which may be configured with user preferences, user information, phone numbers, network keys, Bluetooth™ personal identification number (PIN) code, Bluetooth™ link-key information, etc.

A first user of first wearable electronic device 10a(1) may send a first design (e.g., coordinate data for the first design) made in first formable display unit 18a (e.g., in the formable material layer of the display unit) to a second user of second wearable electronic device 10a(2). In one example embodiment, the first user may create the first design using formable display unit 18a(1) and may transmit the design to first electronic device 68(1) using wireless module 42(1) in wearable electronic device 10a. In turn, the first user may communicate the first design to the second user by sending the second user a message, email, etc. from first electronic device 68(1) to second electronic device 68(2) through network 70. The second user may receive the design on second electronic device 68(2) and may communicate the design to second wearable electronic device 10a(2) using wireless module 42(2) in wearable electronic device 10a(2).

In one or more embodiments, the second user can provide touch inputs, voice commands, gestures, etc. to ready wearable electronic device 10a(2) to receive the first design or to retrieve the design from second electronic device 68(2) through a wireless connection with the device using the second wireless module 42(2) in second wearable electronic device 10a(2). In one or more embodiments, a haptic alert or other type of alert may alert the second user that the first design has been communicated to the second wearable electronic device 10a(2). The second user may view the design by providing one or more touch inputs, a voice command, gesture, etc. to the second wearable electronic device 10a(2) to initiate viewing the design and, based on one or more inputs, formable display control logic in wearable electronic device 10a(2) may recreate the design on second formable display unit 18a(2) using coordinate data for the design. In one or more embodiments, the design may be transmitted to electronic device 68 using a short messaging service (SMS), multimedia messaging service (MMS), application to person (A2P) messaging, email messaging over transmission control protocol/internet protocol (TCP/IP), etc.

In another example embodiment, the first user may send the first design from first wearable electronic device 10a(1) using wireless module 42(1) to second wearable electronic device 10a(2), which may receive the design using wireless module 42(1) over network 70, which may be a WPAN or some other like 802.11 wireless network. Thus, in one or more embodiments, wearable electronic devices may be capable of storing communication information for other like wearable electronic devices in order to communicate designs over a network. By like wearable electronic device, it is meant that the like wearable electronic device may include a formable display unit therein.

In another example embodiment, the first user may communicate the first design from first wearable electronic device 10a(1) to second wearable electronic device 10a(2) using NFC. For example, the first user may tap first wearable electronic device 10a(1) against second wearable electronic device 10a(2) to communicate the design to second wearable electronic device 10a(2).

In one or more embodiments, a user may also communicate the first design to a plurality of users over network 70. Say for example the first user may be a coach of a football team and a plurality of second users may be players on the team. The coach may create a design, say, a play, in formable display unit 18a(1) and send the play to each player on the field that may also be wearing a like wearable electronic device. The design could be sent to each player individually or to a quarterback alone, who could then send the design to the other players by tapping devices using NFC techniques, using Bluetooth™, invisible infrared light, Wi-Fi, etc.

In one or more embodiments, the first design can also be uploaded to or retrieved by electronic device 68(1) using a wired connection in combination with a port (e.g., port 40) on wearable electronic device 68(1). The user can then use electronic device 68(1) to send the first design to another user. In one or more embodiments, designs may be shared through an application marketplace, social media site, etc. Virtually any other means or methods could be used to communicate designs for wearable electronic devices as described herein in the present disclosure and, thus, are clearly within the scope of the present disclosure.

Figure 4C:
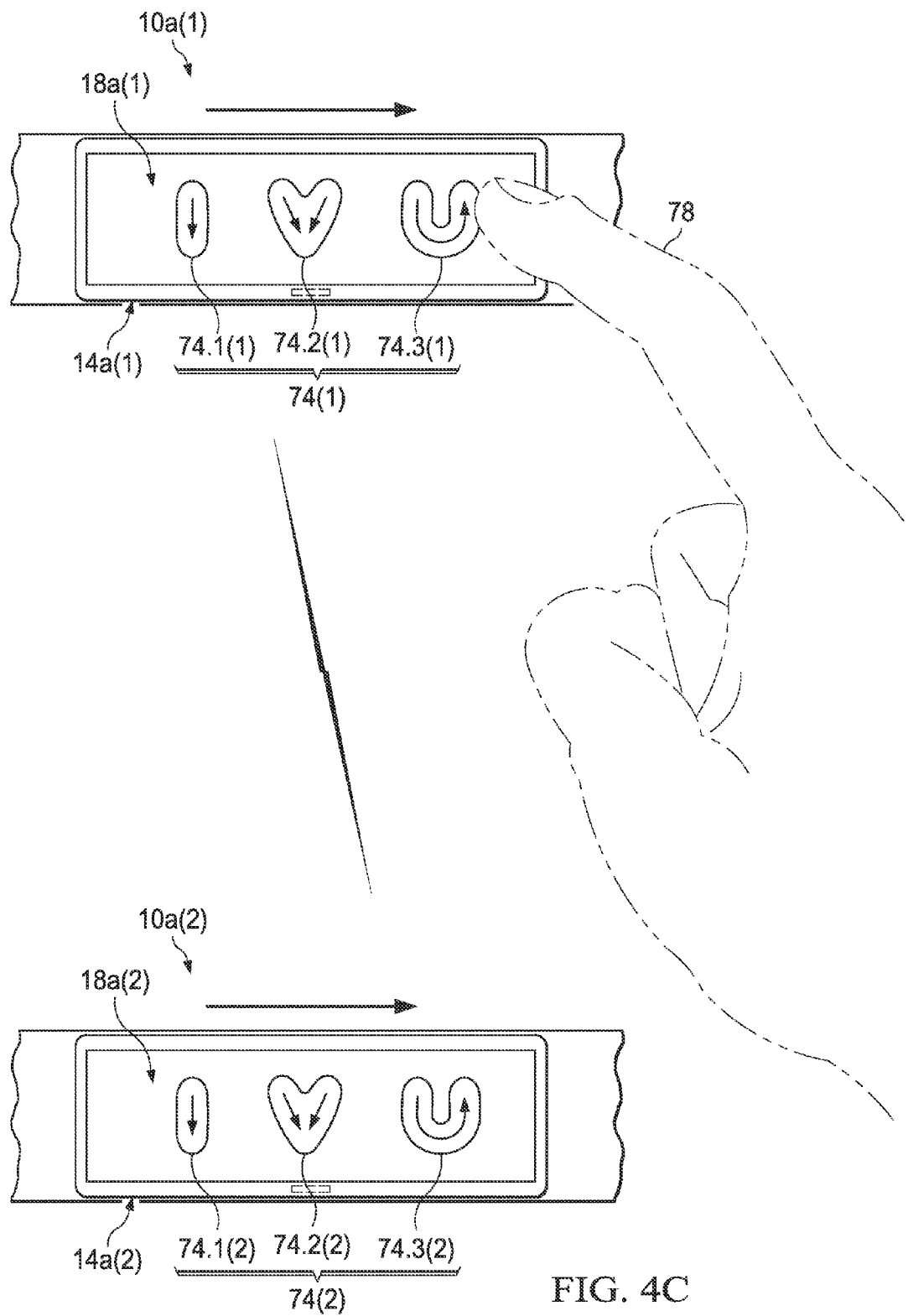
FIG. 4C is a simplified block diagram illustrating an embodiment of the pair of wearable electronic devices of FIG. 4B, in accordance with one embodiment of the present disclosure.

Turning to FIG. 4C, FIG. 4C is a simplified block diagram illustrating an embodiment of the pair of wearable electronic devices 10a(1) and 10a(2) of FIG. 4B in accordance with one embodiment of the present disclosure. Recall, that coordinate data may include an ordered sequence of coordinates that may correspond to an order that interactions were performed by a user during creation of a design.

In one or more embodiments, designs created on the first formable display unit 18a(1) may be communicated from the first wearable electronic device 10a(1) to the second wearable electronic device 10a(2) and can be recreated on the second formable display unit 18a(2) (e.g., the formable material layer of the unit) in the same order that the original design was created by the first user on the first formable display unit 18a(1). Thus, the second user may share an emotional experience with the first user as the design unfolds on the second formable display unit 18a(2)—almost as though the first user was creating the design on the second user's formable display unit 18a(2) themselves.

As shown in FIG. 4C, a design 74(1), which reads 'I ♥ U' may be created by the first user in first formable display unit 18a(1). Design 74(1) may be created as a combination of sub-parts, sub-part 74.1(1) 'I', sub-part 74.2(1) '♥' and sub-part 74.3(1) 'U' from left to right as illustrated by the arrow above first formable display unit 18a(1). For example, sub-part 74.1(1) may be created using a downward stroke of a finger 78 of the first user; sub-part 74.2(1) may be created using a pair of downward strokes that meet at the base; and sub-part 74.3(1) may be created using a curved stroke. An ordered sequence of the strokes may be included in the coordinate data for design 74(1).

Design 74(1) may be communicated to second wearable electronic device 10a(2) using one or more means as discussed above (e.g., over a network, through another electronic device, using NFC, etc.) and, using coordinate data for design 74(1) that may include the ordered sequence of the strokes used to create design 74(1), formable display control logic in wearable electronic device 10a(2) can recreate the design on the second formable display unit 18a(2) in the same ordered sequence that design 74(1) was created on the first formable display unit 18a(2). For example, design 74(2), which is the same as design 74(1), may be created on second formable display 18(2) including sub-part 74.1(2), which may be created in the same manner/strokes as 74.1(1); sub-part 74.2(2), which may be created in the same manner/strokes as 74.2(1); and sub-part 74.3(2), which may be created in the same manner/strokes as 74.3(1). Thus, shared designs can be recreated on shared devices in the same manner as they were created on an original device.

Figure 5:
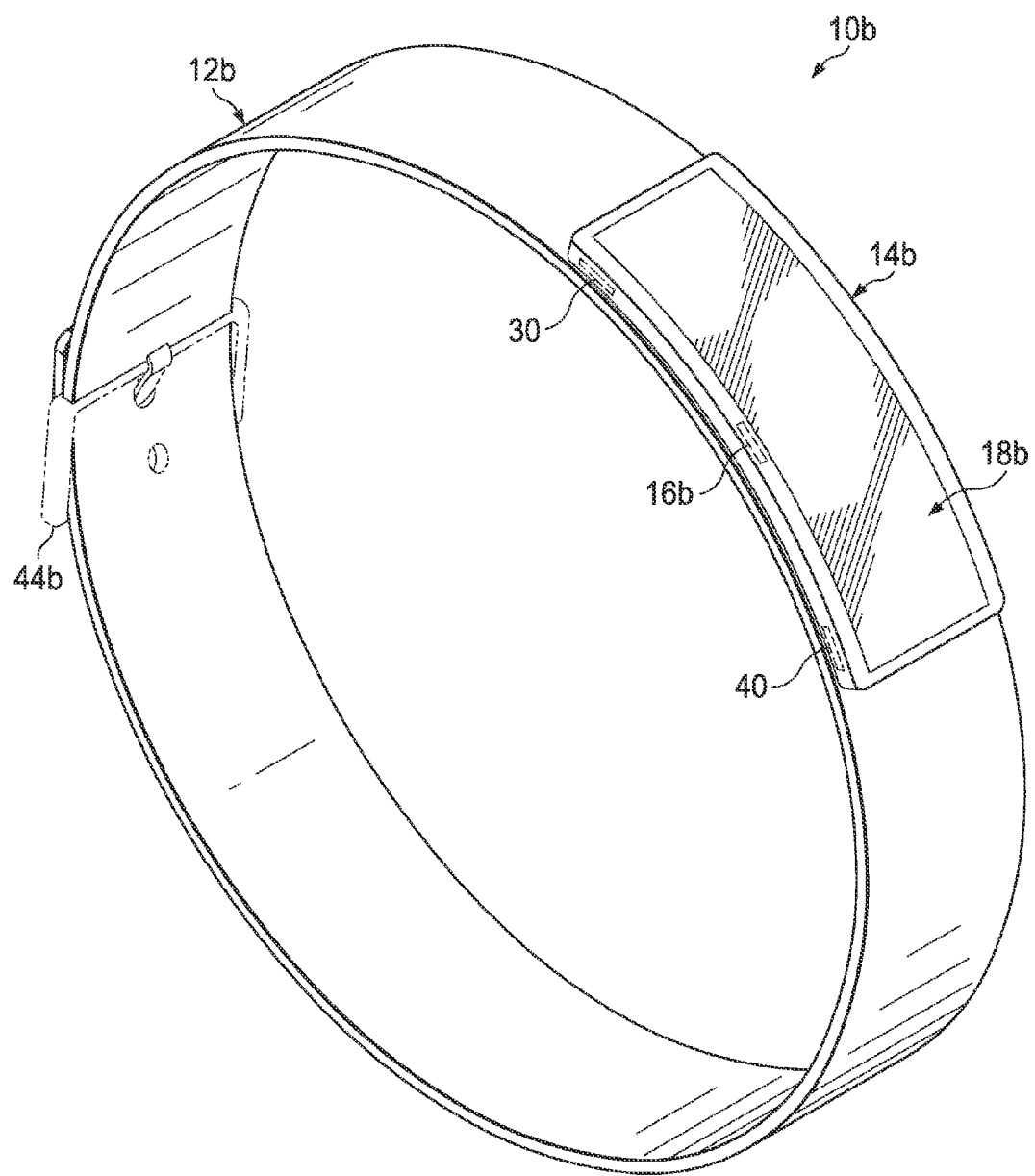
FIG. 5 is a simplified orthographic view illustrating an embodiment of a wearable electronic device, in accordance with one embodiment of the present disclosure.

Turning to FIG. 5, FIG. 5 is a simplified orthographic view illustrating an embodiment of a wearable electronic device 10b, in accordance with an embodiment of the present disclosure. Wearable electronic device 10b may include a strap portion 12b and a display portion 14b. Display portion 14b can include a formable display unit 18b and a motion input element 16b. Display portion 14b may be disposed within/on and/or supported by strap portion 12b. Motion input element 16b may be disposed within/on and/or supported by display portion 14b. In one or more embodiments, display portion 14b may include a touch input element 30 (or multiple touch input elements to control various functions for wearable electronic device 10b. In one or more embodiments, display portion 14b may also include a port 40 to serve various functions as described above for wearable electronic device 10a. In one or more embodiments, strap portion 14b may include a latch portion 44b similar to that as described above for wearable electronic device 10a or may be of a continuous design.

Wearable electronic device 10 includes the same communication, operational capabilities, etc. as wearable electronic device 10a, except that the formable material layer for formable display unit 18b may be made of a shape memory polymer (SMP). As referred to herein, a formable material layer made of an SMP may be referred to as an SMP formable material layer.

In general, SMPs are polymeric materials that can be reset from a deformed shape back to a default shape by heating the SMP to a temperature near or greater than its glass transition temperature. An SMP can also hold a deformed shape until it is reset back to its default shape. SMPs are also capable of being deformed by both bending and stretching actions. A default shape for an SMP may be 'set' by heating the SMP above its glass transition temperature to a formation temperature, which will be higher than the glass transition temperature, and setting a desired shape for the SMP at or above the formation temperature.

In one or more embodiments an SMP formable material layer for formable display unit 18b of wearable electronic device 10b can be configured to have a glass transition temperature ranging from approximately 30° (86° F.) to approximately 55° C. (131° F.), although other temperatures are certainly encompassed by alternative embodiments of the present disclosure. In one or more embodiments, an SMP formable material layer can be made of thermoplastic or thermoset polymeric materials. In one or more embodiments, an SMP formable material layer may be formed to have a default shape (e.g., a default flat position) having a flat surface, which may extend across the display area for formable display unit 18b. In one or more embodiments, the SMP formable material layer may range in thickness from approximately 100 µm to approximately 1.5 mm, although other dimensions are certainly encompassed by alternative embodiments of the present disclosure.

As noted, an SMP can hold a deformed shape until it is reset back to its default shape by applying heat to the SMP to heat to a temperature near or above its glass transition temperature. In one or more embodiments, a SMP formable material layer for formable display unit 18b of wearable electronic device 10b can be made electroactive by including metallic Nickel powder or short Carbon fibers in the polymeric materials used to make the SMP formable material layer. To reset such an SMP formable material layer back to its default flat position, a current may be applied to the SMP formable material layer.

In one or more embodiments, a heating device can be encapsulated in an SMP formable material layer and a current may be applied to the heating device in order to reset the SMP formable material layer back to its default flat position. In one or more embodiments, a heating device could be a wire, insulated wire, resistive device, combination of resistive devices, heating element (e.g., metal, ceramic, composite, etc.). It should be understood, however, that any type of heating device may be used within the scope of the present disclosure.

In one or more embodiments, wearable electronic device 10b may also include a heating device configured around a perimeter of display portion 14b or in some other configuration to heat an SMP formable material layer to reset it back to its default flat position. Regarding use of an SMP formable material layer, an SMP formable material layer may be manipulated in a similar manner as an SMA formable material layer. In one or more embodiments, motion input element 16b may register one or more interactions with formable display unit 18b and motion control logic in wearable electronic device 10b can determine and output coordinate data corresponding to the interactions. Formable display control logic in wearable electronic device 10b may receive the coordinate data and may manipulate an SMP formable material layer in one or more directions based on the coordinate data, which may create a design in the SMP formable material layer that corresponds to the user's interactions. Formable display control logic may manipulate the SMP formable material layer using one or control elements of a control layer of formable display unit 18b, which, similar to formable display unit 18a, can be implemented as one or more micro actuators contained on/within the control layer.

In one or more embodiments, to reset the SMP formable material layer, formable display control logic in wearable electronic device 10b may apply a current to the SMP formable material layer for a predetermined period of time based on one or more user inputs to initiate resetting the SMP formable material layer. This can include applying a current to an electroactive SMP formable material layer or applying a current to a heating device that may be encapsulated in a non-electroactive SMP formable material layer. In one or more embodiments, the predetermined period of time may be within an approximate range of 1 s to 10 s, although other times are certainly encompassed by alternative embodiments of the present disclosure. The predetermined period of time should be sufficient to allow the SMP formable to reset back to its default shape but not overheat the wire, which may damage strap portion 12a, the SMP formable material layer or any electronics within wearable electronic device 10b. Additionally, in one or more embodiments, the predetermined period of time may be adjusted based on the amount of current applied to the heating device, the configuration of the heating device in the SMP formable material layer and/or any other variable related to the construction of wearable electronic device 10b, including the composition, thickness, length, shape, etc. of the SMP formable material layer. For any alternative embodiments including any SMP formable material layer, the predetermined period of time may be adjusted in a similar manner.

Figure 6A:
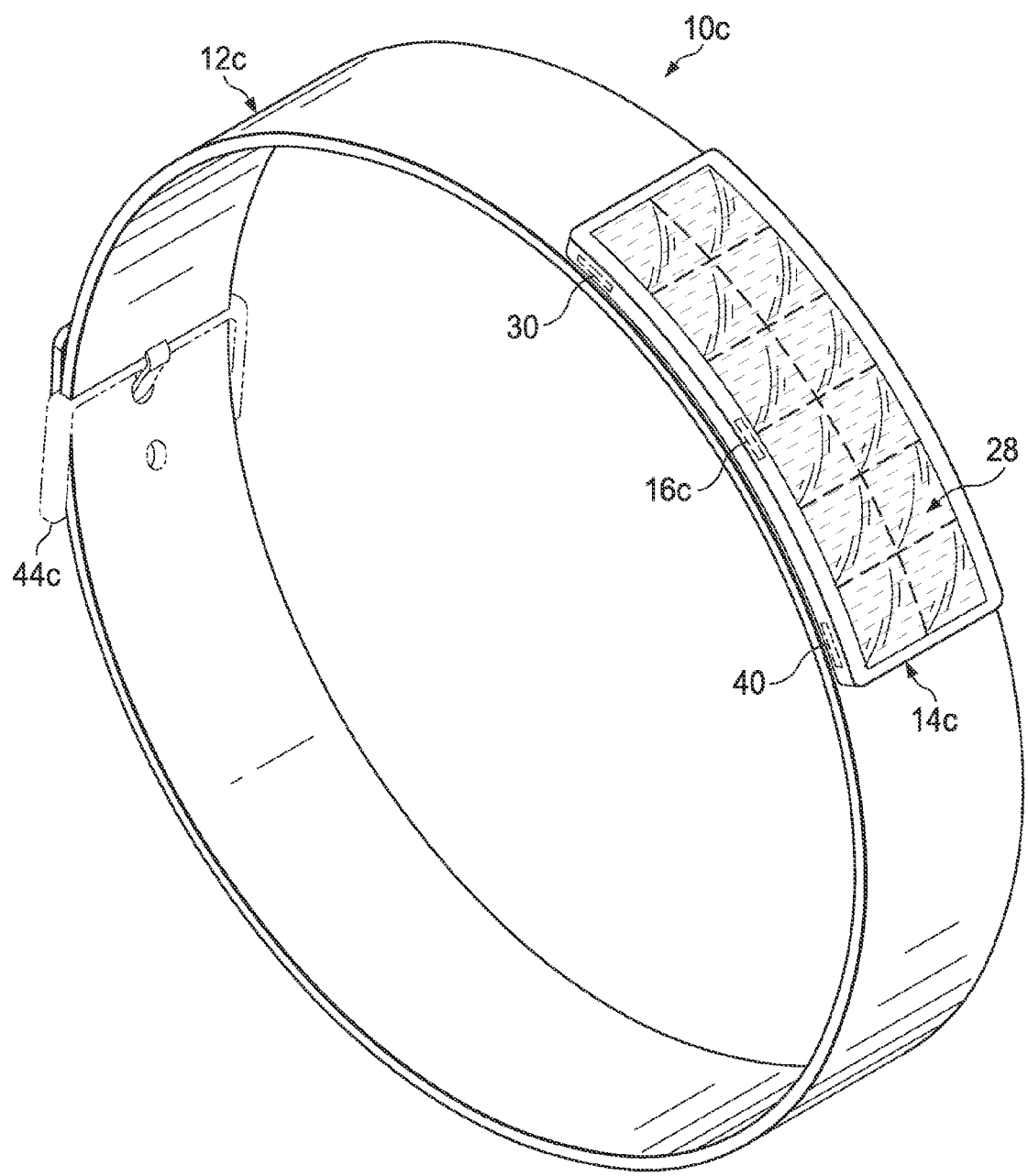
FIG. 6A is a simplified orthographic view illustrating an embodiment of a wearable electronic device, in accordance with an embodiment of the present disclosure.

Turning to FIG. 6A, FIG. 6A is a simplified orthographic view illustrating an embodiment of a wearable electronic device 10c, in accordance with an embodiment of the present disclosure. Wearable electronic device 10c may include a strap portion 12c and a display portion 14c. Display portion 14c can include a motion input element 16c and a formable display unit 28, which may include a formable material layer. Display portion 14c may be disposed within/on and/or supported by strap portion 12c. Motion input element 16c may be disposed within/on and/or supported by display portion 14c. In one or more embodiments, display portion 14c may include a touch input element 30 (or multiple touch input elements to control various functions for wearable electronic device 10c. In one or more embodiments, display portion 14c may also include a port 40 to serve various functions as described above for wearable electronic device 10a. In one or more embodiments, strap portion 12c can include a latch portion 44c similar to those described above for wearable electronic device 10a or may be of a continuous design.

Wearable electronic device 10c may differ from wearable electronic device 10a and 10b in that wearable electronic device 10c may include a formable material layer that may include a ferrofluid, which may be manipulated in a different manner than the SMA formable material layer of wearable electronic device 10a and the SMP formable material layer of wearable electronic device 10b. Thus, formable display unit 28 may include different control elements in a control layer of formable display unit 28 than the control elements as described for wearable electronic devices 10a and 10b. As referred to herein in the present disclosure, a formable material layer that includes a ferrofluid may be referred to as a ferrofluid formable material layer.

In general, a ferrofluid is made of magnetic particles that are suspended in a carrier fluid, typically a solvent and/or water. When exposed to or in the presence of a magnetic field the surface of a ferrofluid can be made to form patterns of peaks and valleys. In one or more embodiments, a ferrofluid for formable display unit 28 can include magnetic particles made of Iron or other magnetite or hematite compound that contains Iron. In one or more embodiments, a ferrofluid for formable display unit 28 can include magnetic particles that can have a diameter of 10 nm or less.

In one or more embodiments, control elements for the control layer of formable display unit 28 can be implemented as micro electromagnetic (EM) solenoids, which may be controlled by formable display control logic in wearable electronic device 10c to generate an electromagnetic field (EMF) in order to manipulate the ferrofluid material layer of formable display unit 28. In one or more embodiments, a ferrofluid formable material layer can be manipulated in a first direction from a first position (e.g., a default position) to a second position (e.g., a deformed position) by applying power to one or more micro EM solenoids (e.g., control elements of the control layer) to generate an EMF in order to form excite the ferrofluid material layer in an upward direction to the second position. In one or more embodiments, a ferrofluid formable material layer can be manipulated in a second direction (e.g., back down) by removing power from the one or more EM solenoids.

Aside from these differences, the general operation of wearable electronic device 10c may be similar to that as described above for wearable electronic device 10a and wearable electronic device 10b. In one or more embodiments, motion input element 16c may register one or more interactions with formable display unit 28, which can include, but not be limited to, a user dragging a finger along formable display unit 28 or interacting with an area above formable display unit 28. Motion control logic in wearable electronic device 10c can determine and output coordinate data based on the interactions. Formable display control logic in wearable electronic device 10c may receive the coordinate data and may manipulate the ferrofluid formable material layer in one or more directions based on the coordinate data, which may create a design in ferrofluid formable material layer that corresponds to the user's interactions. In one or more embodiments, the coordinate data may include an ordered sequence of coordinates that correspond to an order that the interactions were performed with formable display unit 28.

Designs created on wearable electronic device 10c can be stored, shared, communicated, etc. with one or more other electronic devices, etc. In one or more embodiments, wearable electronic devices 10a, 10b and 10c can be configured to share designs created on any type of formable display units, for example, those that may include an SMA or SMP type of formable material layer and those that may include a ferrofluid type of formable material layer. For example, the shared designs may, in their most basic form, include coordinate data that can provide a common basis for sharing designs between like wearable electronic devices. Even if wearable electronic devices may have different display sizes, coordinate data for a design on a first display of one size could be converted to fit on a second display of a different size by processing the coordinate data according to one or more image processing, signal processing or other type of processing algorithms that may compensate for the size differences. In this manner, wearable electronic devices including formable display units (and, further, any electronic device that may include a formable display unit) could be used to create an ecosystem of customized designs that could be shared or communicated between one or more users, one or more formable display types and/or one or more electronic device types.

Figure 6B:
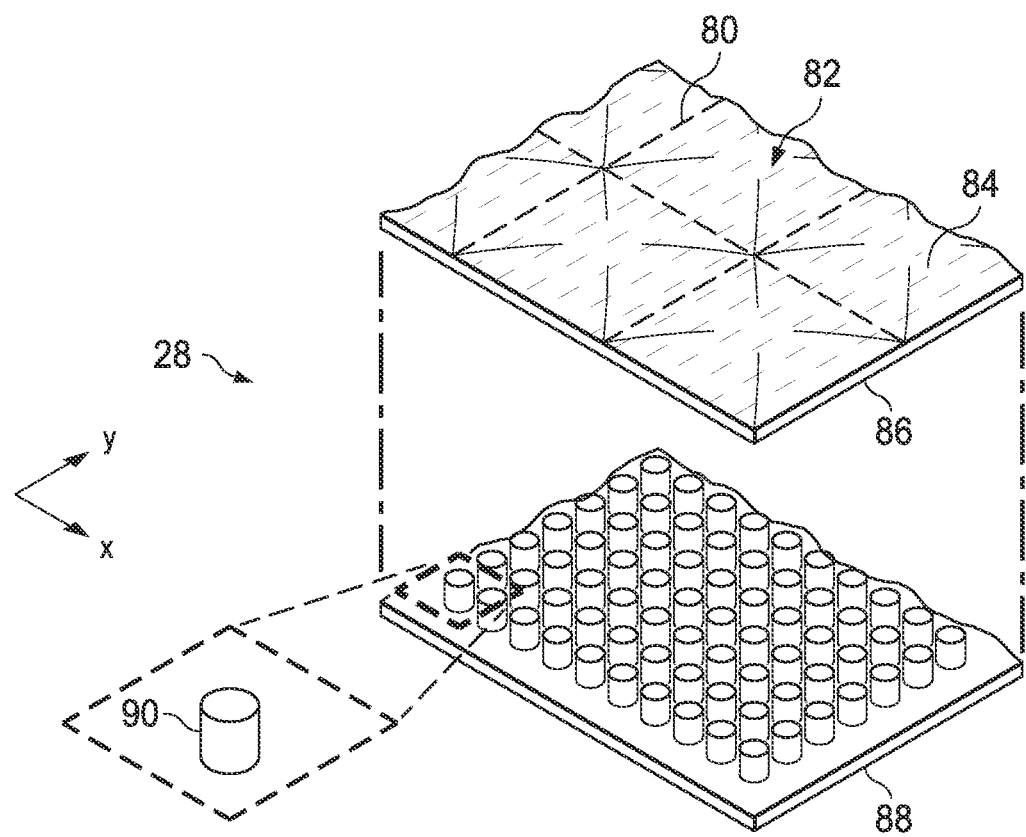
FIG. 6B is a simplified exploded partial view illustrating an embodiment of a formable display unit of a wearable electronic device, in accordance with one embodiment of the present disclosure.

Turning to FIG. 6B, FIG. 6B is a simplified exploded partial view illustrating an embodiment of formable display unit 28 of wearable electronic device 10c, in accordance with one embodiment of the present disclosure. As illustrated in FIG. 6B, formable display unit 28 can include first insulating layer 82, a ferrofluid formable material layer 84, a second insulating layer 86 and a control layer 88, which can include a plurality of control elements that may be implemented as micro EM solenoids 90. In one or more embodiments, micro EM solenoids 90 can be arranged in an X-Y array within/on control layer 88.

In one or more embodiments, first insulating layer 82 may be affixed to a top surface of second insulating layer 86 using a plurality of seams 80. In one or more embodiments, seams 80 may be configured in a manner to affix first insulating layer 82 to second insulating layer 86 such that ferrofluid formable material layer 84 may remain in place rather than shift across the surface of second insulating layer. In one or more embodiments, seams 80 may be formed before ferrofluid may be added between the layers. In one or more embodiments, ferrofluid can be injected through injected through one or more injection sites or ports (not shown) configured in second insulating layer to allow the formation of uniform pockets of ferrofluid formable material layer 84 between first and second insulating layers 82 and 86, respectively. In one or more embodiments, the pockets may be approximately 3 mm to 4 mm deep, and may range in size from approximately 10 mm×10 mm to approximately 15 mm×15 mm depending on the size of formable display unit 28, although other dimensions are certainly encompassed by alternative embodiments of the present disclosure.

For wearable electronic device 10c, micro EM solenoids 90 may be capable of generating an EMF in order to manipulate ferrofluid formable material layer 84 in an outward direction at one or more locations for corresponding interactions on formable display unit 18c. In one or more embodiments, each micro EM solenoid 90 can be configured with a plunger (not shown) in order to focus an EM field at a particular coordinate location for formable display unit 28. In one or more embodiments, micro EM solenoids 90 can be used to manipulate ferrofluid formable material layer 84 according to coordinate data determined from one or more interactions with formable display unit 28 or according to coordinate data for one or more designs that may be stored in memory within wearable electronic device 10c or communicated to wearable electronic device 10c.

In one or more embodiments, first and second insulating layers 82 and 86 can be made of latex, plastic, silicone, rubber, elastomeric polymers, polymers, any type of waterproof material, etc. In one or more embodiments, first and second insulating layers 82 and 86 can be configured as films, membranes or coatings on ferrofluid formable material layer 84, which can range in thickness from approximately 50 μm to approximately 6 mm, although other thicknesses are certainly encompassed by alternative embodiments of the present disclosure. In one or more embodiments, first insulating layer 82 may be made of a material that can withstand dragging of a finger or stylus across the layer without ripping or tearing the layer.

In one or more embodiments, micro EM solenoids 90 may have a length/width or diameter (depending on form factor) of approximately 1 mm, although other dimensions are certainly encompassed by alternative embodiments of the present disclosure. In one or more embodiments, an X-Y coordinate map for formable display unit 28 can be stored in memory of wearable electronic device 10c and may include data corresponding to the arrangement/spacing of micro EM solenoids 90 (e.g., control elements) of control layer 88 in relation to the display area of formable display unit 28. In one or more embodiments, formable display control logic in wearable electronic device 10c may account for the arrangement/spacing of micro EM solenoids 90 and may accordingly adjust the coordinate data in order to control micro EM solenoids 90 in a manner such that manipulations of the ferrofluid formable material layer 84 accurately track interactions registered by the motion input controller.

Figure 7:
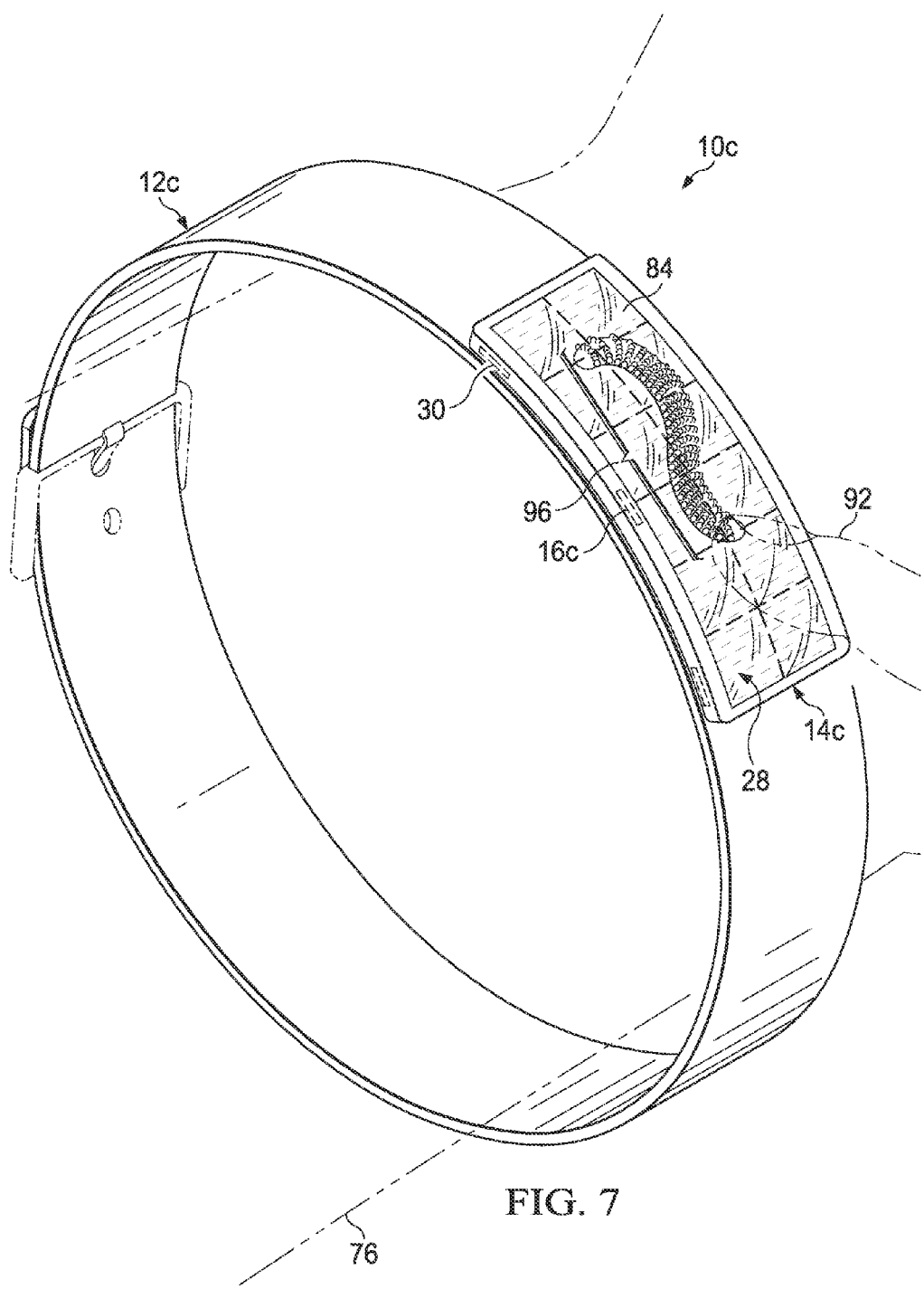
FIG. 7 is a simplified orthographic view illustrating an embodiment of a wearable electronic device, in accordance with an embodiment of the present disclosure.

Turning to FIG. 7, FIG. 7 is a simplified orthographic view illustrating an embodiment of wearable electronic device 10c in accordance with one embodiment of the present disclosure. Wearable electronic device 10c can include strap portion 12c and display portion 14c. Display portion 14c can include motion input element 16c and formable display unit 28, which may include ferrofluid formable material layer 84. As shown in FIG. 6, wearable electronic device 10c can be worn on a user's wrist and the user may drag a finger 92 along formable display unit 28 to create a design 96 in ferrofluid formable material layer 84, which can be made of a ferrofluid.

Wearable electronic device 10c can be readied to receive motion inputs for one or more designs to be created on formable display unit 28 similar to those described above (e.g., provide touch inputs to touch input element 30, or multiple touch input elements, provide gestures, voice commands, etc.) Motion control logic in wearable electronic device 10c can determine and output coordinate data based on the interactions of user's finger 92 and can output coordinate data corresponding to the interactions. Formable display control logic in wearable electronic device 10c may receive the coordinate data and may manipulate, based on the coordinate data, the ferrofluid formable material layer 84 in an upward direction using EM solenoids of the control layer to create design 96 in ferrofluid formable material layer 84 that corresponds to the finger drag.

In one or more embodiments, design 96 may be stored in wearable electronic device 10c or communicated to another wearable electronic device or another electronic device using wireless communication circuitry in wearable electronic device 10c.

In one or more embodiments, to reset formable display unit 18b (e.g., clear design 94), one or more inputs, voice commands, gestures, etc. could be provided to wearable electronic device 10c, which may cause formable control logic in the device to cut power or deactivate the activated control elements being used to create design 94 thereby allowing formable material layer (e.g., to fall back to the surface of the second insulating layer. Virtually any other means or methods could be used to control operation and or communication for wearable electronic devices as described herein in the present disclosure and, thus, are clearly within the scope of the present disclosure.

Figure 8:
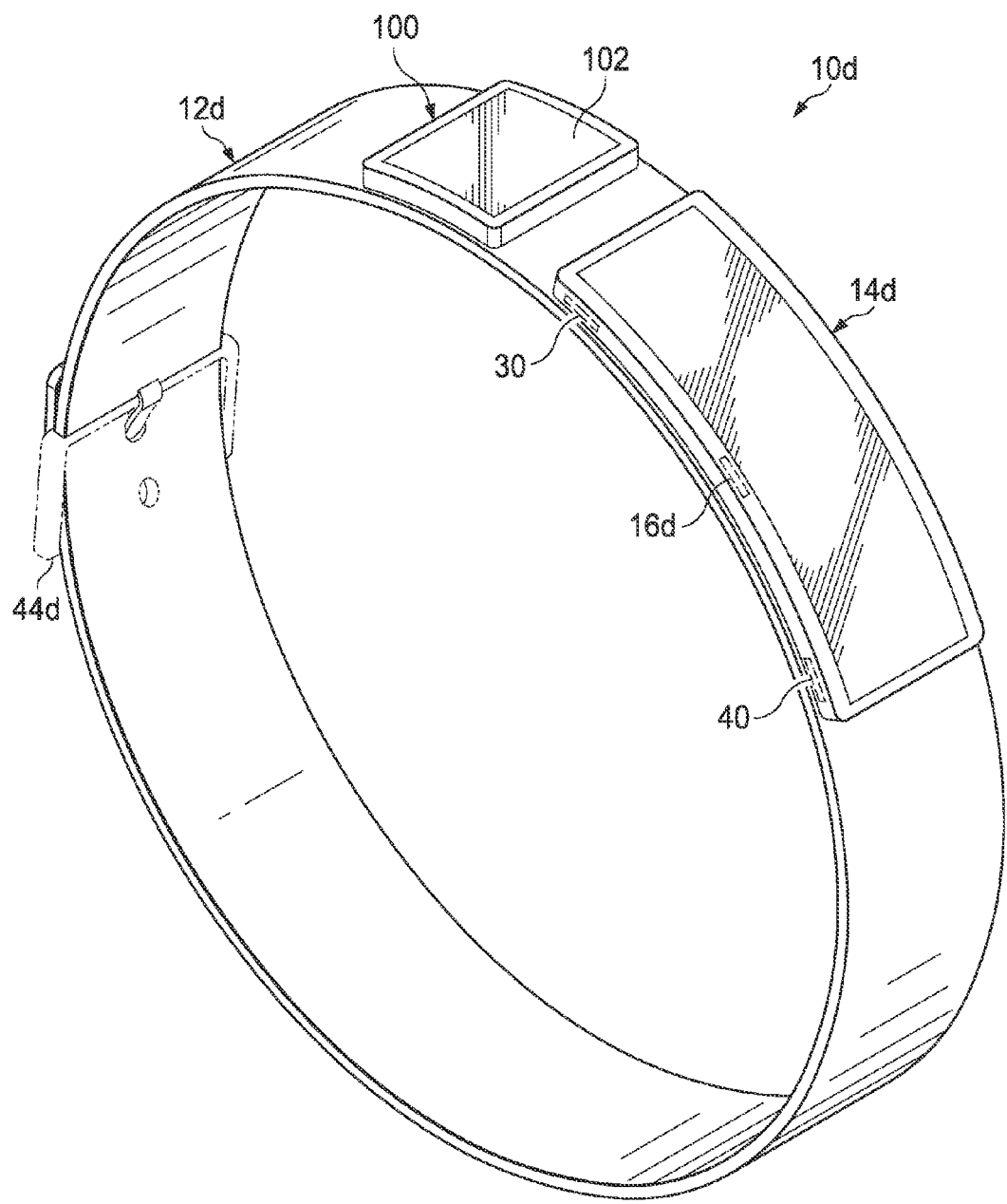
FIG. 8 is a simplified orthographic view illustrating an embodiment of a wearable electronic device, in accordance with an embodiment of the present disclosure.

Turning to FIG. 8, FIG. 8 is a simplified orthographic view illustrating an embodiment of a wearable electronic device 10d in accordance with one embodiment of the present disclosure. Wearable electronic device 10d can include strap portion 12d, first display portion 14d having and second display portion 100. In one or more embodiments, first display portion 14d can be configured as display portion 14a including formable display unit 18a, display portion 14b including either formable display unit 18b or display portion 14c, including formable display unit 28. Second display portion 100 may include a user interface (UI) display 102 or other type of graphical display. In general, wearable electronic device 10c can be configured as either wearable electronic devices 10a, 10b or 10c with the addition of second display portion 100 including UI display 102. In one or more embodiments, first display portion 14d may also include one or more touch input elements 30, a motion input element 16d and/or a port 40 to serve various functions as described above. In one or more embodiments, strap portion 12d can include a latch portion 44d similar to those described above for wearable electronic device 10a or may be of a continuous design.

In one or more embodiments, UI display 102 is a screen that can be a liquid crystal display (LCD) screen, transparent LCD screen, light-emitting diode (LED) display screen, transparent LED display screen, organic light-emitting diode (OLED) display screen, transparent LED display screen or any other suitable display screen system. UI display 102 may also be a touchscreen display, which may include a capacitive or resistive touchscreen layer over the screen of UI display 102. In one or more embodiments, electronics (e.g., processors, controllers, memory, etc.) for wearable electronic device 10*d* may reside in first display portion 14*d* and second display portion 100. In another embodiment, electronics (e.g., processors, controllers, memory, etc.) can also reside in strap portion 12*d*. In an embodiment, wearable electronic device 10*d* may contain a camera, a microphone, and a speaker.

In one or more embodiments, UI display 102 may include logic to control a formable display unit in first display portion 14*d*, to save one or more designs created on the formable display unit, to communicate one or more designs to other users/electronic devices, to receive or retrieve one or more designs from other wearable electronic devices or other electronic devices in general. In general, UI display 102 may include logic to control various operations for wearable electronic device 10*c* in place of or in combination with operating means provided by second display portion 14*c*.

Figure 9:
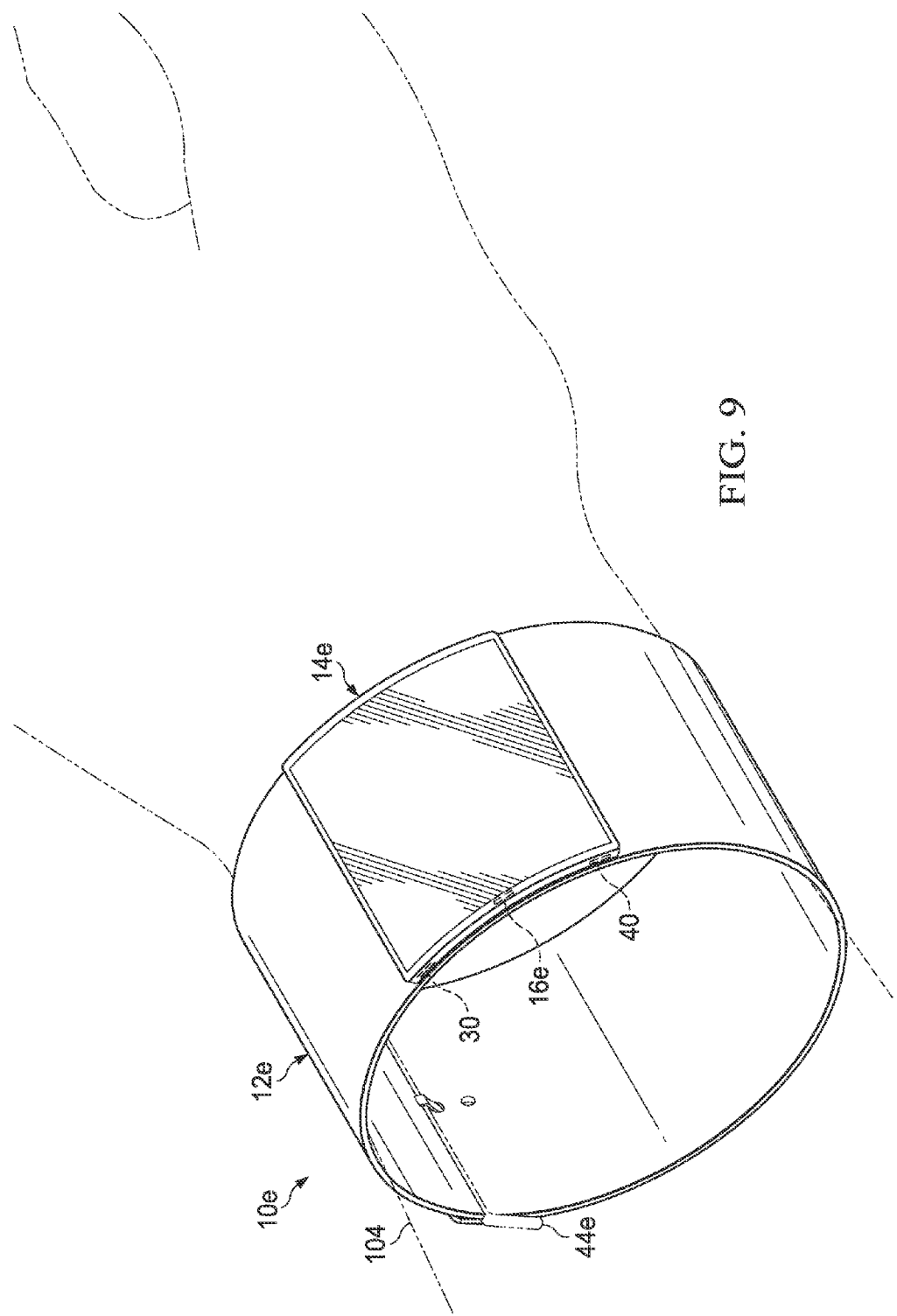
FIG. 9 is a simplified orthographic view illustrating an embodiment of a wearable electronic device, in accordance with an embodiment of the present disclosure.

Turning to FIG. 9, FIG. 9 is a simplified orthographic view illustrating an embodiment of a wearable electronic device 10*e* in accordance with one embodiment of the present disclosure. Wearable electronic device 10*e* can include strap portion 12*e* and display portion 14*e*. In one or more embodiments, display portion 14*e* can be configured as display portion 14*a* including formable display unit 18*a*, display portion 14*b* including either formable display unit 18*b* or display portion 14*c*, including formable display unit 28. In one or more embodiments, display portion 14*e* may also include one or more touch input elements 30, a motion input element 16*e* and/or a port 40 to serve various functions as described above. In one or more embodiments, strap portion 12*e* can include a latch portion 44*e* similar to those described above for wearable electronic device 10*a* or may be of a continuous design.

FIG. 9 illustrates an embodiment of wearable electronic device 10*e* in which strap portion 12*e* and display portion 14*e* can be configured very wide on a user's wrist 104. In various embodiments, the strap portion and/or the display portion can be widened and/or lengthened to provide a larger area for forming designs using the formable display unit of the wearable electronic device. For example, display portion 14*e* could be widened and/or lengthened to provide for drawing plays for a quarterback, as described above. Thus, in various embodiments, the width and or length of the strap portion and/or display portion of the wearable electronic device can be configured to accommodate a variety of uses and can be worn at a variety of locations on the user's person.

Figure 10:
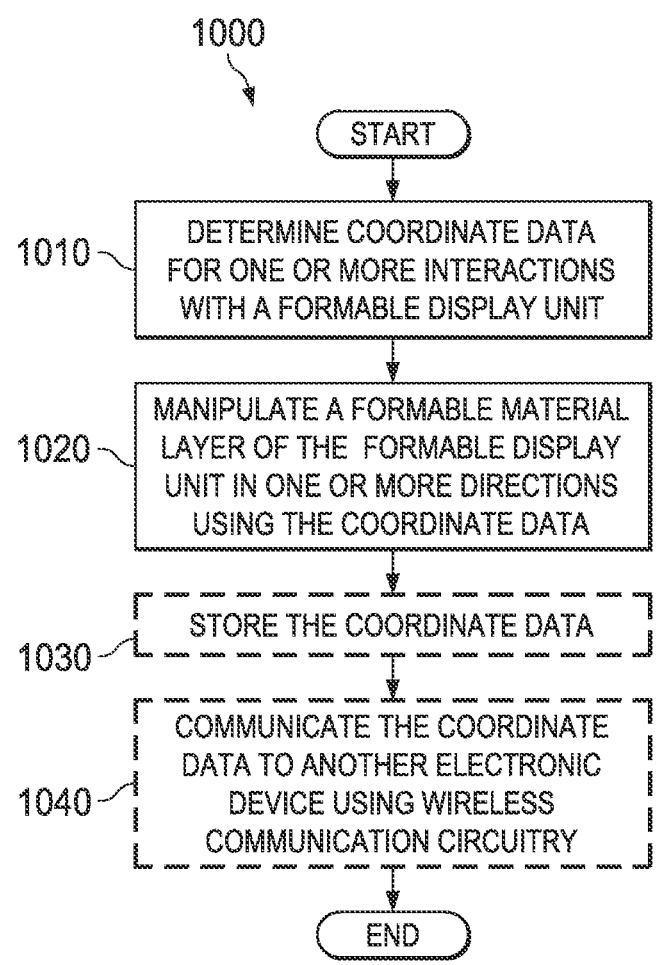
FIG. 10 is a simplified flow diagram illustrating potential operations associated with one embodiment of the present disclosure.

FIG. 10 is a simplified flow diagram 1000 illustrating potential operations for a wearable electronic device formable display system in accordance with one embodiment of the present disclosure. The operations may be used to form a design in a formable display unit of a wearable electronic device, for example, wearable electronic devices 10*a*, 10*b*, 10*c*, 10*d* or 10*e*. At 1010, the system may determine coordinate data based on one or more interactions with a formable display unit. In one or more embodiments, the system may correlate a coordinate map of the formable display unit to the coordinate data in order to adjust the coordinate data based on one or more control elements of a control layer contained in the formable display unit. At 1020, the system may manipulate, based on the coordinate data, manipulate a formable material layer of the formable display unit in one or more directions. The coordinate data may correspond to a design created on the formable display unit, which can be formed by manipulating the formable material layer in one or more directions according to the coordinate data.

In one or more embodiments, the system may cause a current to be supplied the formable material layer to manipulate the formable material layer from a first position to a second position. In one or more embodiments, the system may cause one or more control elements to manipulate the formable material layer from a first position to a second position using the coordinate data. In one or more embodiments, the coordinate data can include an ordered sequence of coordinates that correspond to the order that the one or more interactions were performed with the formable display unit. In one or more embodiments, the system may store the coordinate data at 1030. In yet another example implementation, the system may communicate the coordinate data to another electronic device using wireless communication circuitry at 1040.

Figure 11:
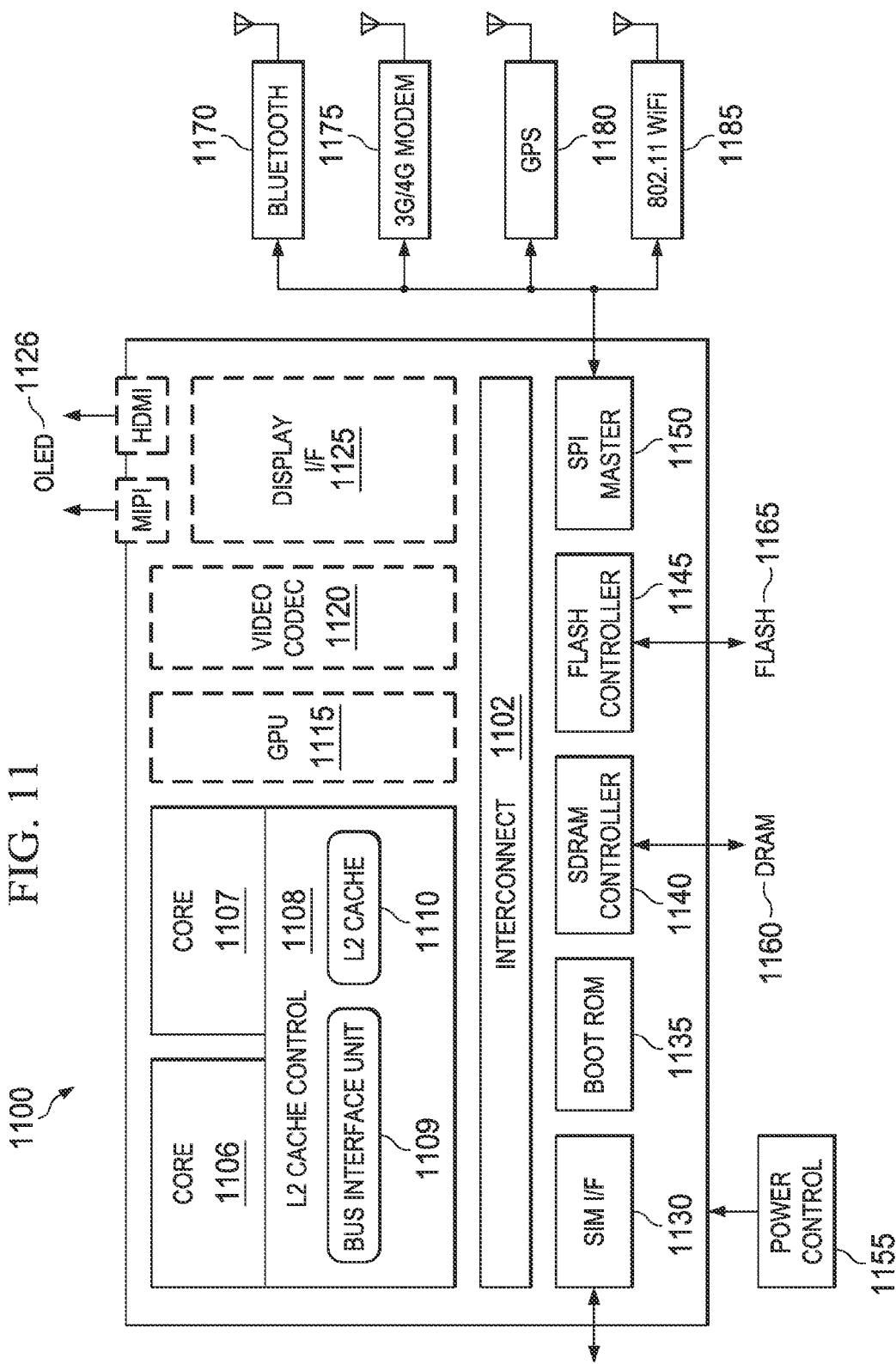
FIG. 11 is a simplified block diagram associated with an example ARM ecosystem on chip (SOC) of the present disclosure.

FIG. 11 is a simplified block diagram associated with an example ARM ecosystem SOC 1100 of the present disclosure. At least one example implementation of the present disclosure can include the formable display features discussed herein and an ARM component. For example, the example of FIG. 11 can be associated with any ARM core (e.g., A-9, A-15, etc.). Further, the architecture can be part of any type of wearable electronic device, tablet, phablet, smartphone (inclusive of Android™ phones, i-Phones™), i-Pad™, Google Nexus™, Microsoft Surface™, video processing components, laptop computer (inclusive of any type of notebook), Ultrabook™ system, any type of touch-enabled input device, etc., which may include a formable display unit.

In this example of FIG. 11, ARM ecosystem SOC 1100 may include multiple cores 1106-1107, an L2 cache control 1108, a bus interface unit 1109, an L2 cache 1110 and an interconnect 1102. In an embodiment of a wearable electronic device that includes a UI display, ARM ecosystem SOC 1100 may include a graphics processing unit (GPU) 1115, a video codec 1120, and a display I/F 1125, which may be associated with mobile industry processor interface (MIPI)/high-definition multimedia interface (HDMI) links that may couple to an LCD, OLED or LED display 1126.

ARM ecosystem SOC 1100 may also include a subscriber identity module (SIM) I/F 1130, a boot read-only memory (ROM) 1135, a synchronous dynamic random access memory (SDRAM) controller 1140, a flash controller 1145, a serial peripheral interface (SPI) master 1150, a suitable power control 1155, a dynamic RAM (DRAM) 1160, and flash 1165. In addition, one or more example embodiments may include one or more communication capabilities, interfaces, and features such as instances of Bluetooth™ 1170, a 3G/4G modem 1175, a global positioning system (GPS) 1180, and an 802.11 WiFi 1185.

In operation, the example of FIG. 11 can offer processing capabilities, along with relatively low power consumption to enable computing of various types (e.g., mobile computing). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 12:
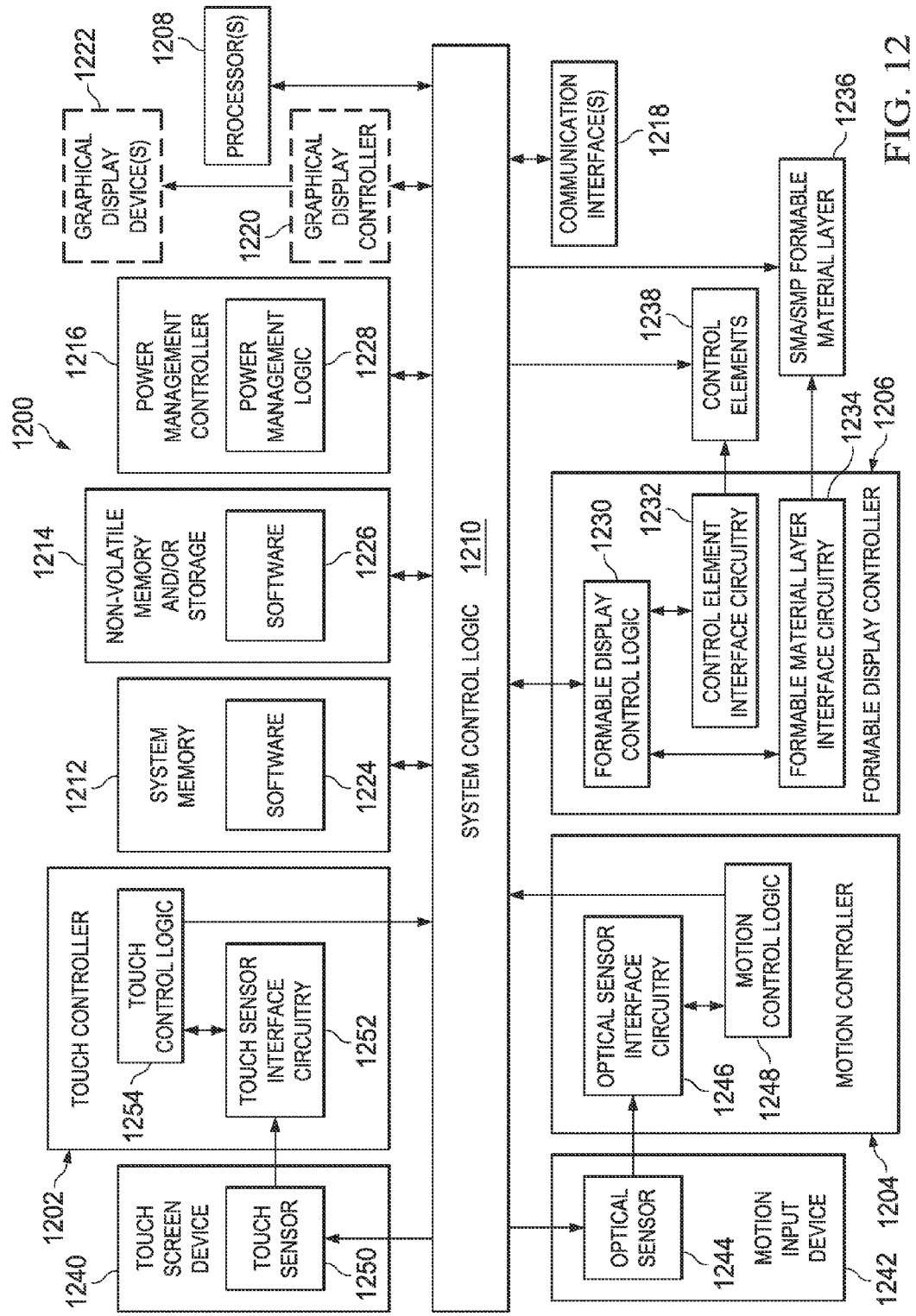
FIG. 12 is a simplified block diagram illustrating example logic that may be used to execute activities associated with the present disclosure.

Turning to FIG. 12, FIG. 12 is a simplified block diagram illustrating potential electronics and logic that may be associated with wearable electronic device 10*a*, 10*b*, 10*c*, 10*d* or 10*e* discussed herein to execute activities associated with the devices. In at least one example embodiment, system 1200 can include a touch controller 1202, a motion controller 1204, a formable display controller 1206, one or more processors 1208, system control logic 1210 coupled to at least one of processor(s) 1208, system memory 1212 coupled to system control logic 1210, non-volatile memory and/or storage device(s) 1214 coupled to system control logic 1210, power management controller 1216 coupled to system control logic 1210 and/or communication interfaces 1218 coupled to system control logic 1210. In an embodiment of a wearable electronic device that includes a graphical display, system 1200 may include a graphical display controller 1220 coupled to system control logic 1210 and graphical display controller 1220 coupled to one or more display device(s) 1222.

Hence, the basic building blocks of any wearable electronic device system that includes a formable display unit (e.g., processor, controller, memory, I/O, etc.) or electronic device system that includes a formable display unit that can be used in conjunction with the teachings of the present disclosure. Certain components could be discrete or integrated into a System on Chip (SoC). Some general system implementations can include certain types of form factors in which system 1200 is part of a more generalized form factor. In alternate implementations, instead of wearable electronic devices, certain alternate embodiments deal with mobile phones, tablet devices, laptops, notebooks, netbooks, etc.

System control logic 1210, in at least one embodiment, can include any suitable interface controllers to provide for any suitable interface to at least one processor 1208 and/or to any suitable device or component in communication with system control logic 1210. System control logic 1210, in at least one embodiment, can include one or more memory controllers to provide an interface to system memory 1212. System memory 1212 may be used to load and store data and/or instructions, for example, for system 1200, or, for example to store an X-Y coordinate map. System memory 1212, in at least one embodiment, can include any suitable volatile memory, such as suitable dynamic random access memory (DRAM) for example, which can be used to store coordinate data for one or more designs formed on a formable display unit and/or store a coordinate map for a formable display unit. As illustrated in FIG. 12, system memory 1212 may store suitable software 1224 and/or non-volatile memory and/or storage device(s). System control logic 1210, in at least one embodiment, can include one or more I/O controllers to provide an interface to touch controller 1202, motion controller 1204, formable display controller 1206, display device 1222, power management controller 1216 and non-volatile memory and/or storage device(s) 1214.

Non-volatile memory and/or storage device(s) 1214 may be used to store data (e.g., an X-Y coordinate map) and/or instructions, for example within software 1226. Non-volatile memory and/or storage device(s) 1214 may include any suitable non-volatile memory, such as flash memory for example, and/or may include any suitable non-volatile storage device(s), such as one or more hard disc drives (HDDs), solid state drives (SSDs), etc. for example.

Power management controller 1216 may include power management logic 1228 configured to control various power management and/or power saving functions. In at least one example embodiment, power management controller 1216 is configured to reduce the power consumption of components or devices of system 1200 that may either be operated at reduced power or turned off when a wearable electronic device is in an inactive state (e.g., not being accessed, etc.). For example, in at least one embodiment, when the wearable electronic device is in an inactive state, power management controller 1216 performs one or more of the following: power down the motion input element and/or controller, the formable display unit and/or the touch sensor; allow one or more of processor(s) 1208 to go to a lower power state if less computing power is required in an inactive or standby state; and shutdown any devices and/or components (e.g., wireless module) that may be unused when an electronic device is in an inactive or standby state.

Communications interface(s) 1218 may provide an interface for system 1200 to communicate over one or more networks and/or with any other suitable device. Communications interface(s) 1218 may include any suitable hardware and/or firmware. Communications interface(s) 1218, in at least one example embodiment, may include, for example, a network adapter, a wireless network adapter, a telephone modem, and/or a wireless modem. System control logic 1210, in at least one embodiment, can include one or more I/O controllers to provide an interface to any suitable input/output device(s) such as, for example, an audio device to help convert sound into corresponding digital signals and/or to help convert digital signals into corresponding sound, a camera or a camcorder.

For at least one embodiment, at least one processor 1208 may be packaged together with logic for one or more controllers of system control logic 1210. In at least one embodiment, at least one processor 1208 may be packaged together with logic for one or more controllers of system control logic 1210 to form a System in Package (SiP). In at least one embodiment, at least one processor 1208 may be integrated on the same die with logic for one or more controllers of system control logic 1210. For at least one embodiment, at least one processor 1208 may be integrated on the same die with logic for one or more controllers of system control logic 1210 to form a System on Chip (SoC).

Formable display controller 1206 may provide for control of a formable display unit, including manipulating a formable material layer of the formable display unit. Formable display controller 1206 may include formable display control logic 1230 and control element interface circuitry 1232. For a formable display unit that includes a formable material layer 1236 made of an SMA or SMP, formable display controller 1206 may additionally include formable material layer interface circuitry 1234, which may be configured to interface with the formable material layer 1236 to supply a current to the layer in order to manipulate formable material layer 1236 back to its default shape. Formable material layer interface circuitry 1234, in at least one embodiment, can include any suitable circuitry to convert any digital coordinate data into analog or digital signals that can be used to apply a current to an SMP or an SMP formable material layer.

For other manipulations of a formable material layer, which can be any of an SMA, SMP or ferrofluid, the formable material layer may be manipulated using one or more control elements 1238, which may be coupled to control element interface circuitry 1232. In one or more embodiments, control elements 1238 may also be coupled to system control logic 1210. In various embodiments, control elements 1238 can be implemented as micro actuators or EM micro solenoids, depending on configuration. Formable display controller 1206 may be configured to control both types of control elements using formable display control logic 1230 and control element interface circuitry 1232.

Formable display control logic 1230 may be coupled to control element interface circuitry 1232 and formable material layer interface circuitry 1234 to help manipulate a formable material layer of a formable display unit in one or more directions based on coordinate data for one or more interactions with a formable display unit. In one or more embodiments, the manipulations can also be made using coordinate data for a design received on a wearable electronic device from another device or for recreating a design saved on a wearable electronic device. Formable display control logic 1230 may be implemented using any suitable logic, including any suitable hardware, firmware, and/or software logic (e.g., non-transitory tangible media), that may depend, for example, at least in part on the circuitry used for control element interface circuitry 1232 and formable material layer interface circuitry 1234.

Formable display control logic 1230 may receive coordinate data corresponding to one or more interactions with a formable display unit and may cause control element interface circuitry 1232 to control one or more control elements 1238 in order to manipulate a formable material layer using the coordinate data, which can include activating or deactivating control elements 1238. Control element interface circuitry 1232, in at least one embodiment, can include any suitable circuitry to convert any digital coordinate data into analog or digital signals that can be used to provide control for control elements 1238.

For motion control, motion controller 1204 may include optical sensor interface circuitry 1246 and motion control logic 1248. Optical sensor interface circuitry 1246 may be coupled to one or more optical sensor(s) 1244, which may be included in motion input device 1242, to detect one or more interactions with a formable display unit. Motion input device 1242 may register one or more interactions with a formable display unit based on reflections of infrared light from the interactions that may be received by optical sensor(s) 1244. Optical sensor interface circuitry 1246, in one embodiment, may support any motion and/or gesture recognition technology. Optical sensor interface circuitry 1246, in at least one embodiment, can include any suitable circuitry to convert electronic sensor signals, which may be analog or digital or both, corresponding to reflections received by optical sensor(s) 1244 into digital coordinate data.

Motion control logic 1248 may be coupled to optical sensor interface circuitry 1246 to help control optical sensor interface circuitry 1246 in any suitable manner to detect one or more interactions or gestures using motion input device 1242 and optical sensor 1244. Motion control logic 1248 for at least one example embodiment may also be coupled to system control logic 1210 to output in any suitable manner digital coordinate data corresponding to interactions detected by optical sensor interface circuitry 1246. Motion control logic 1248 may be implemented using any suitable logic, including any suitable hardware, firmware, and/or software logic (e.g., non-transitory tangible media), that may depend, for example, at least in part on the circuitry used for optical sensor interface circuitry 1246.

Motion control logic 1248 may be coupled to system control logic 1210 to output coordinate data or other electronic sensor signals to system control logic 1210 and/or at least one processor 1208 for processing. For example, the coordinate data may be processed to control one or more control elements for a formable display using formable display controller 1206. At least one processor 1208 for at least one embodiment may execute any suitable software to process electronic sensor signal data output from motion control logic 1248. Suitable software may include, for example, any suitable driver software and/or any suitable application software.

For touch control, touch controller 1202 may include touch sensor interface circuitry 1252 and touch control logic 1254. Touch sensor interface circuitry 1252 may be coupled to one or more touch sensor(s) 1250 to detect touch input(s) with a formable display unit onto a first touch surface layer and a second touch surface layer for a touch screen device 1240. Touch sensor interface circuitry 1252 may include any suitable circuitry that may depend, for example, at least in part on the touch-sensitive technology used for touch screen device 1240, which may include the one or more touch sensor(s) 1250. Touch sensor interface circuitry 1252, in one embodiment, may support any suitable multi-touch technology. Touch sensor interface circuitry 1252, in at least one embodiment, can include any suitable circuitry to convert analog signals corresponding to a first touch surface layer and a second surface layer into any suitable digital coordinate data.

Touch control logic 1254 may be coupled to touch sensor interface circuitry 1252 to help control touch sensor interface circuitry 1252 in any suitable manner to detect touch inputs (e.g., interactions) over a first touch surface layer and a second touch surface layer. Touch control logic 1254 for at least one example embodiment may also be coupled to system control logic 1210 to output in any suitable manner digital coordinate data corresponding to touch input detected by touch sensor interface circuitry 1252. Suitable electronic sensor signal data for at least one embodiment may include, for example, touch location or coordinate data for the one or more interactions performed on or above the formable display unit. Touch control logic 1254 may be implemented using any suitable logic, including any suitable hardware, firmware, and/or software logic (e.g., non-transitory tangible media), that may depend, for example, at least in part on the circuitry used for touch sensor interface circuitry 1252.

Touch control logic 1254 may be coupled to system control logic 1210 to output digital coordinate data or other electronic sensor signals to system control logic 1210 and/or at least one processor 1208 for processing. For example, the coordinate data may be processed to control one or more control elements 1238 for a formable display using formable display controller 1206. At least one processor 1208 for at least one embodiment may execute any suitable software to process electronic sensor signal data output from touch control logic 1254. Suitable software may include, for example, any suitable driver software and/or any suitable application software.

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., width, length, thickness, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include a strap portion and a display portion that is secured to the strap portion, wherein the display portion can include a formable display unit that comprises a formable material layer configured to be manipulated in one or more directions. Note, that in at least one embodiment, the formable material layer is configured to be manipulated in a first direction from a first position to a second position, which can be held until the formable material layer is manipulated in a second direction back to the first position. In various embodiments, the formable material layer may comprise at least one of a shape memory alloy, a shape memory polymer and a ferrofluid.

In another example implementation, a formable display unit may include a formable material layer configured to be manipulated in one or more directions; a first insulating layer configured over the formable material layer; a second insulating layer configured beneath the formable material layer; and a control layer configured beneath the second insulating layer, the control layer including a plurality of control elements. Note, that in at least one embodiment, the formable material layer can be manipulated in a first direction by one or more of the plurality of control elements and can be manipulated in a second direction by providing a current to the formable material layer from a current source. In at least other embodiment, the formable material layer can be a ferrofluid fluid, which is manipulated the first direction and the second direction by one or more of the plurality of control elements.

In other example implementations, a method may be provided, which may include determining coordinate data for one or more interactions with a formable display unit; and manipulating, based on the coordinate data, a formable material layer of the display unit in one or more directions. In at least one embodiment, the method may include manipulating the formable material layer in a first direction from a first position to a second position by one or more control elements using the coordinate data. In at least one other embodiment, the method may include manipulating the formable material layer in a second direction from the second position back to the second position by supplying a current to the formable material layer. In at least one other embodiment, the method may include communicating the coordinate data to another electronic device using wireless communication circuitry.

Other Notes and Examples

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is a wearable electronic device, comprising: a strap portion; and a display portion that is secured to the strap portion, wherein the display portion includes a formable display unit that comprises a formable material layer configured to be manipulated in one or more directions.

In Example 2, the subject matter of Example 1 can optionally include the formable material layer being configured to be manipulated in a first direction from a first position to a second position, which can be held until the formable material layer is manipulated in a second direction back to the first position.

In Example 3, the subject matter of any one of Examples 1-2 can optionally include the formable material layer comprising one of: a shape memory alloy; a shape memory polymer; and a ferrofluid.

In Example 4, the subject matter of any one of Examples 1-3 can optionally include the formable display unit further comprising a control layer including a plurality of control elements configured to manipulate the formable material layer in one or more directions.

In Example 5, the subject matter of Example 4 can optionally include the plurality of control elements being organized in an array on the control layer and include at least one of: a plurality of micro actuators; and a plurality of micro electromagnetic solenoids.

In Example 6, the subject matter of any one of Examples 1-3 can optionally include the formable display unit further comprising: a first insulating layer configured over the formable material layer; a second insulating layer configured beneath the formable material layer; and a control layer configured beneath the second insulating layer, the control layer including a plurality of control elements.

In Example 7, the subject matter of any one of Examples 1-6 can optionally include logic to receive coordinate data for one or more interactions registered by a motion input element and to manipulate, based on the coordinate data, the formable material layer in one or more directions using a plurality of control elements in a control layer of the formable display unit.

In Example 8, the subject matter of any of Examples 1-7 can optionally include a secondary display portion including a touch screen.

Example 9 is formable display unit, comprising: a formable material layer configured to be manipulated in one or more directions; a first insulating layer configured over the formable material layer; a second insulating layer configured beneath the formable material layer; and a control layer configured beneath the second insulating layer, the control layer including a plurality of control elements.

In Example 10, the subject matter of Example 9 can optionally include the formable material layer being configured to be manipulated in a first direction from a first position to a second position, which can be held until the formable material layer is manipulated in a second direction back to the first position.

In Example 11, the subject matter of any one of Examples 9-10 can optionally include the formable material layer being manipulated in the first direction by one or more of the plurality of control elements and is manipulated in the second direction by providing a current to the formable material layer from a current source.

In Example 12, the subject matter of any one of Examples 9-10 can optionally include the formable material layer being a ferrofluid, which is manipulated the first direction and the second direction by one or more of the plurality of control elements.

In Example 13, the subject matter of any one of Examples 9-10 can optionally include the formable material layer comprising one of: a shape memory alloy; a shape memory polymer; and a ferrofluid.

In Example 14, the subject matter of any one of Examples 9-13 can optionally include the plurality of control elements being organized in an X-Y array on the control layer and include at least one of: a plurality of micro actuators; and a plurality of micro electromagnetic solenoids.

Example 15 is at least one computer readable storage medium comprising instructions that, when executed, cause an apparatus to: determine coordinate data for one or more interactions with a formable display unit; and manipulate, based on the coordinate data, a formable material layer of the formable display unit in one or more directions.

In Example 16, the subject matter of Example 15 can optionally include instructions that, when executed, cause an apparatus to cause one or more control elements to manipulate, based on the coordinate data, the formable material layer in a first direction from a first position to a second position.

In Example 17, the subject matter of any one of Examples 15-16 can optionally include instructions that, when executed, cause an apparatus to cause a current to be supplied the formable material layer to manipulate the formable material layer in a second direction from the second position back to the first position.

In Example 18, the subject matter of any one of Examples 15-17 can optionally include the coordinate data including an ordered sequence of coordinates that correspond to an order that the one or more interactions were performed.

In Example 19, the subject matter of Example 18 can optionally include instructions that, when executed, cause an apparatus to cause one or more control elements to manipulate, based on the ordered sequence of coordinates, the formable material layer in a first direction from a first position to a second position.

In Example 20, the subject matter of any one of Examples 15-19 can optionally include instructions that, when executed, cause an apparatus to communicate the coordinate data to another electronic device using wireless communication circuitry.

Example 21 is a method comprising: determining coordinate data for one or more interactions with a formable display unit; and manipulating, based on the coordinate data, a formable material layer of the formable display unit in one or more directions.

In Example 22, the subject matter of Example 21 can optionally include manipulating, based on the coordinate data, the formable material layer in a first direction from a first position to a second position by one or more control elements.

In Example 23, the subject matter of any one of Examples 21-22 can optionally include manipulating the formable material layer in a second direction from the second position back to the first position by supplying a current to the formable material layer.

In Example 24, the subject matter of any one of Examples 21-23 can optionally include the coordinate data including an ordered sequence of coordinates that correspond to an order that the one or more interactions were performed.

In Example 25, the subject matter of Example 24 can optionally include manipulating, based on the ordered sequence of coordinates, the formable material layer in a first direction from a first position to a second position by one or more control elements.

In Example 26, the subject matter of any one of Examples 21-25 can optionally include communicating the coordinate data to another electronic device using wireless communication circuitry.

In Example 27, the subject matter of any one of Examples 21-26 can optionally include the formable material layer comprising one of a shape memory alloy; a shape memory polymer; and a ferrofluid.

Example 28 is an apparatus comprising means for performing the method of any one of Examples 21-27.

In Example 29, the subject matter of Example 28 can optionally include the means for performing the method comprising a processor and a memory.

In Example 30, the subject matter of Example 29 can optionally include the memory comprising machine readable instructions, that when executed cause the apparatus to perform the method of any one of Examples 21-27.

In Example 31, the subject matter of any one of Examples 28-30 is a computing system.

Example 32 is at least one computer readable medium comprising instructions that, when executed, implement a method or realize an apparatus as recited in any one of Examples 1-14 or 21-27.

Example 33 is an apparatus comprising: means for determining coordinate data for one or more interactions with a formable display unit; and means for manipulating, based on the coordinate data, a formable material layer of the formable display unit in one or more directions.

In Example 34, the subject matter of Example 33 can optionally include means for manipulating, based on the coordinate data, the formable material layer in a first direction from a first position to a second position by one or more control elements.

In Example 35, the subject matter of any one of Examples 33-34 can optionally include means for manipulating the formable material layer in a second direction from the second position back to the first position by supplying a current to the formable material layer.

In Example 36, the subject matter of any one of Examples 33-35 can optionally include the coordinate data including an ordered sequence of coordinates that correspond to an order that the one or more interactions were performed.

In Example 37, the subject matter of Example 36 can optionally include means for manipulating, based on the ordered sequence of coordinates, the formable material layer in a first direction from a first position to a second position by one or more control elements.

In Example 38, the subject matter of any one of Examples 33-37 can optionally include means for communicating the coordinate data to another electronic device.

In Example 39, the subject matter of any one of Examples 33-38 can optionally include the formable material layer comprising at least one of: a shape memory alloy; a shape memory polymer; and a ferrofluid.

What is claimed is:

1. A wearable electronic device, comprising:
   a strap portion;
   a display portion that is secured to the strap portion, wherein the display portion includes a formable display unit that comprises a formable material layer configured to be manipulated in one or more directions; and
   a memory to store coordinate data associated with a plurality of interactions that correspond to a design to be created for the formable display unit using the formable material layer.

2. The wearable electronic device of claim 1, wherein the formable material layer is configured to be manipulated in a first direction from a first position to a second position for the design, which can be held until the formable material layer is manipulated in a second direction back to the first position.

3. The wearable electronic device of claim 1, wherein the formable material layer comprises one of:
   a shape memory alloy;
   a shape memory polymer; and
   a ferrofluid.

4. The wearable electronic device of claim 1, wherein the formable display unit further comprises a control layer including a plurality of control elements configured to manipulate the formable material layer in one or more directions for the design.

5. The wearable electronic device of claim 4, wherein the plurality of control elements are organized in an array on the control layer and include at least one of:
   a plurality of micro actuators; and
   a plurality of micro electromagnetic solenoids.

6. The wearable electronic device of claim 1, wherein the formable display unit further comprises:
   a first insulating layer configured over the formable material layer;
   a second insulating layer configured beneath the formable material layer; and
   a control layer configured beneath the second insulating layer, the control layer including a plurality of control elements.

7. The wearable electronic device of claim 1, further comprising:
   logic to receive the coordinate data for the plurality of interactions that correspond to the design that are registered by a motion input element and to manipulate, based on the coordinate data, the formable material layer in one or more directions for the design using a plurality of control elements in a control layer of the formable display unit.

8. The wearable electronic device of claim 1, further comprising:
   a secondary display portion including a touch screen.

9. A formable display unit, comprising:
   a formable material layer configured to be manipulated in one or more directions;
   a first insulating layer configured over the formable material layer;
   a second insulating layer configured beneath the formable material layer;
   a control layer configured beneath the second insulating layer, the control layer including a plurality of control elements; and
   a memory to store coordinate data associated with a plurality of interactions that correspond to a design to be created for the formable display unit using the formable material layer.

10. The formable display unit of claim 9, wherein the formable material layer is configured to be manipulated in a first direction from a first position to a second position for the design, which can be held until the formable material layer is manipulated in a second direction back to the first position.

11. The formable display unit of claim 10, wherein the formable material layer is manipulated in the first direction by one or more of the plurality of control elements and is manipulated in the second direction by providing a current to the formable material layer from a current source.

12. The formable display unit of claim 11, wherein the formable material layer is a ferrofluid, which is manipulated the first direction and the second direction by one or more of the plurality of control elements.

13. The formable display unit of claim 9, wherein the formable material layer comprises one of:
   a shape memory alloy;
   a shape memory polymer; and
   a ferrofluid.

14. The formable display unit of claim 9, wherein the plurality of control elements are organized in an X-Y array on the control layer and include at least one of:
   a plurality of micro actuators; and
   a plurality of micro electromagnetic solenoids.

15. At least one non-transitory computer readable storage medium comprising instructions that, when executed, cause an apparatus to:
   determine coordinate data for a plurality of interactions with a formable display unit, wherein the coordinate data corresponds to a design to be created for the formable display unit;
   store the coordinate data and
   manipulate, based on the coordinate data, a formable material layer of the formable display unit in one or more directions to create the design for the formable display unit using the formable material layer.

16. The medium of claim 15, further comprising instructions that, when executed, cause an apparatus to:
   cause one or more control elements to manipulate, based on the coordinate data, the formable material layer in a first direction from a first position to a second position to create the design for the formable display unit.

17. The medium of claim 16, further comprising instructions that, when executed, cause an apparatus to:
   cause a current to be supplied the formable material layer to manipulate the formable material layer in a second direction from the second position back to the first position.

18. The medium of claim 15, wherein the coordinate data includes an ordered sequence of coordinates that correspond to an order that the plurality of interactions were performed.

19. The medium of claim 18, further comprising instructions that, when executed, cause an apparatus to:
cause one or more control elements to manipulate, based on the ordered sequence of coordinates, the formable material layer in a first direction from a first position to a second position for the design.

20. The medium of claim 15, further comprising instructions that, when executed, cause an apparatus to:
communicate the coordinate data to another electronic device using wireless communication circuitry.

21. A method comprising:
determining coordinate data for a plurality of interactions with a formable display unit, wherein the coordinate data corresponds to a design to be created for the formable display unit;
storing the coordinate data; and
manipulating, based on the coordinate data, a formable material layer of the formable display unit in one or more directions to create the design for the formable display unit using the formable material layer.

22. The method of claim 21, further comprising:
manipulating, based on the coordinate data, the formable material layer in a first direction from a first position to a second position using one or more control elements to create the design for the formable display unit.

23. The method of claim 22, further comprising:
manipulating the formable material layer in a second direction from the second position back to the first position by supplying a current to the formable material layer.

24. The method of claim 21, further comprising:
communicating the coordinate data to another electronic device using wireless communication circuitry.

25. The method of claim 21, wherein the formable material layer comprises one of:
a shape memory alloy;
a shape memory polymer; and
a ferrofluid.

* * * * *